(12) United States Patent
Watanabe

(10) Patent No.: US 12,524,181 B2
(45) Date of Patent: Jan. 13, 2026

(54) MEMORY SYSTEM WITH CONTROLLER CONFIGURED TO FETCH COMMANDS

(71) Applicant: Kioxia Corporation, Tokyo (JP)

(72) Inventor: Shuichi Watanabe, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/413,607

(22) Filed: Jan. 16, 2024

(65) Prior Publication Data

US 2024/0248644 A1    Jul. 25, 2024

(30) Foreign Application Priority Data

Jan. 20, 2023 (JP) .................................. 2023-007399

(51) Int. Cl.
G06F 3/06 (2006.01)

(52) U.S. Cl.
CPC .......... *G06F 3/0659* (2013.01); *G06F 3/0679* (2013.01); *G06F 3/0604* (2013.01)

(58) Field of Classification Search
CPC .... G06F 3/0659; G06F 3/0679; G06F 3/0604; G06F 3/0656; G06F 3/061
See application file for complete search history.

(56) References Cited

U.S. PATENT DOCUMENTS

| 10,642,500 | B2 | 5/2020 | Benisty | |
| 10,705,885 | B2* | 7/2020 | Tuffs | G06F 9/445 |
| 10,896,131 | B2 | 1/2021 | Bazarsky et al. | |
| 11,188,255 | B2 | 11/2021 | Teh et al. | |
| 2015/0301763 | A1* | 10/2015 | Shaharabany | G06F 12/0246 |
| | | | | 711/147 |
| 2018/0188975 | A1 | 7/2018 | Benisty | |
| 2018/0335978 | A1* | 11/2018 | Tidwell | G06F 1/28 |
| 2019/0303309 | A1* | 10/2019 | Sahoo | H04L 47/6215 |
| 2020/0326890 | A1* | 10/2020 | Benisty | G06F 3/0611 |
| 2020/0364163 | A1* | 11/2020 | Schauer | G06F 13/4282 |
| 2020/0409874 | A1* | 12/2020 | Moss | G06F 12/0246 |
| 2021/0048947 | A1 | 2/2021 | Frolikov et al. | |
| 2021/0133111 | A1* | 5/2021 | Lee | G06F 9/5016 |
| 2022/0057958 | A1* | 2/2022 | Patriarca | G06F 3/061 |
| 2022/0342703 | A1* | 10/2022 | Hong | G06F 3/0679 |
| 2022/0413708 | A1* | 12/2022 | Canepa | G06F 3/0611 |
| 2023/0280941 | A1* | 9/2023 | Agrawal | G06F 3/0659 |
| | | | | 711/154 |
| 2023/0350586 | A1* | 11/2023 | Sharma | G06F 3/0625 |

OTHER PUBLICATIONS

"NVM Express Base Specification, revision 2.0a" NVM Express, Inc, Jul. 23, 2021 URL: https://nvmexpress.org/changes-in-nvm-express-revision-2-0 (454 pages).

* cited by examiner

*Primary Examiner* — Edward J Dudek, Jr.
(74) *Attorney, Agent, or Firm* — Foley & Lardner LLP

(57) ABSTRACT

A controller of a memory system estimates a use of each of a plurality of command queues based on types of one or more commands fetched from each of the plurality of command queues. The controller determines a command queue from which a next command is to be fetched from the plurality of command queues based on the use of each of the plurality of command queues and a usage state of a resource in the memory system. The controller fetches a command from the determined command queue.

20 Claims, 12 Drawing Sheets

EXAMPLE OF RR ARBITRATION:

| Step | SQ TO BE FETCHED | NUMBER OF COMMANDS TO BE FETCHED |
|---|---|---|
| 1 | SQ0 | N |
| 2 | SQ1 | N |
| 3 | SQ2 | N |
| 4 | SQ3 | N |
| 5 | SQ0 | N |
| ... | ... | ... |

422

| SQ IDENTIFICATION INFORMATION | TAG |
|---|---|
| SQ0 | FOR READ |
| SQ1 | FOR WRITE |
| SQ2 | GENERAL-PURPOSE |
| SQ3 | GENERAL-PURPOSE |
| ⋮ | ⋮ |

FIG. 5

| SQ | SQ0 | | | SQ1 | | | SQ2 | | |
|---|---|---|---|---|---|---|---|---|---|
| | FIRST READ COUNTER (#Reads) | FIRST WRITE COUNTER (#Writes) | FIRST GENERAL-PURPOSE COUNTER (#Non-RWs) | FIRST READ COUNTER (#Reads) | FIRST WRITE COUNTER (#Writes) | FIRST GENERAL-PURPOSE COUNTER (#Non-RWs) | FIRST READ COUNTER (#Reads) | FIRST WRITE COUNTER (#Writes) | FIRST GENERAL-PURPOSE COUNTER (#Non-RWs) |
| COUNTER | 100 | 5 | 10 | 20 | 90 | 5 | 30 | 30 | 55 |

| SQ | SQ0 | | | SQ1 | | |
|---|---|---|---|---|---|---|
| COUNTER | FIRST READ COUNTER (#Reads) | FIRST WRITE COUNTER (#Writes) | FIRST GENERAL-PURPOSE COUNTER (#Non-RWs) | FIRST READ COUNTER (#Reads) | FIRST WRITE COUNTER (#Writes) | FIRST GENERAL-PURPOSE COUNTER (#Non-RWs) |
| | 0 | 0 | 0 | 0 | 0 | 0 |

| SQ | SQ0 | | | SQ1 | | |
|---|---|---|---|---|---|---|
| COUNTER | FIRST READ COUNTER (#Reads) | FIRST WRITE COUNTER (#Writes) | FIRST GENERAL-PURPOSE COUNTER (#Non-RWs) | FIRST READ COUNTER (#Reads) | FIRST WRITE COUNTER (#Writes) | FIRST GENERAL-PURPOSE COUNTER (#Non-RWs) |
| | <u>1</u> | 0 | 0 | 0 | 0 | 0 |

| SQ | SQ0 | | | SQ1 | | |
|---|---|---|---|---|---|---|
| COUNTER | FIRST READ COUNTER (#Reads) | FIRST WRITE COUNTER (#Writes) | FIRST GENERAL-PURPOSE COUNTER (#Non-RWs) | FIRST READ COUNTER (#Reads) | FIRST WRITE COUNTER (#Writes) | FIRST GENERAL-PURPOSE COUNTER (#Non-RWs) |
| | 1 | 0 | 0 | 0 | <u>1</u> | 0 |

| SQ | SQ0 | | | SQ1 | | |
|---|---|---|---|---|---|---|
| COUNTER | FIRST READ COUNTER (#Reads) | FIRST WRITE COUNTER (#Writes) | FIRST GENERAL-PURPOSE COUNTER (#Non-RWs) | FIRST READ COUNTER (#Reads) | FIRST WRITE COUNTER (#Writes) | FIRST GENERAL-PURPOSE COUNTER (#Non-RWs) |
| | 1 | 0 | 1 | 0 | 1 | 0 |

| SQ | SQ0 | | | SQ1 | | |
|---|---|---|---|---|---|---|
| COUNTER | FIRST READ COUNTER (#Reads) | FIRST WRITE COUNTER (#Writes) | FIRST GENERAL-PURPOSE COUNTER (#Non-RWs) | FIRST READ COUNTER (#Reads) | FIRST WRITE COUNTER (#Writes) | FIRST GENERAL-PURPOSE COUNTER (#Non-RWs) |
| | 100 | 5 | 10 | 5 | 100 | 10 |

| SQ IDENTIFICATION INFORMATION | TAG |
|---|---|
| SQ0 | FOR READ |
| SQ1 | FOR WRITE |
| ⋮ | ⋮ |

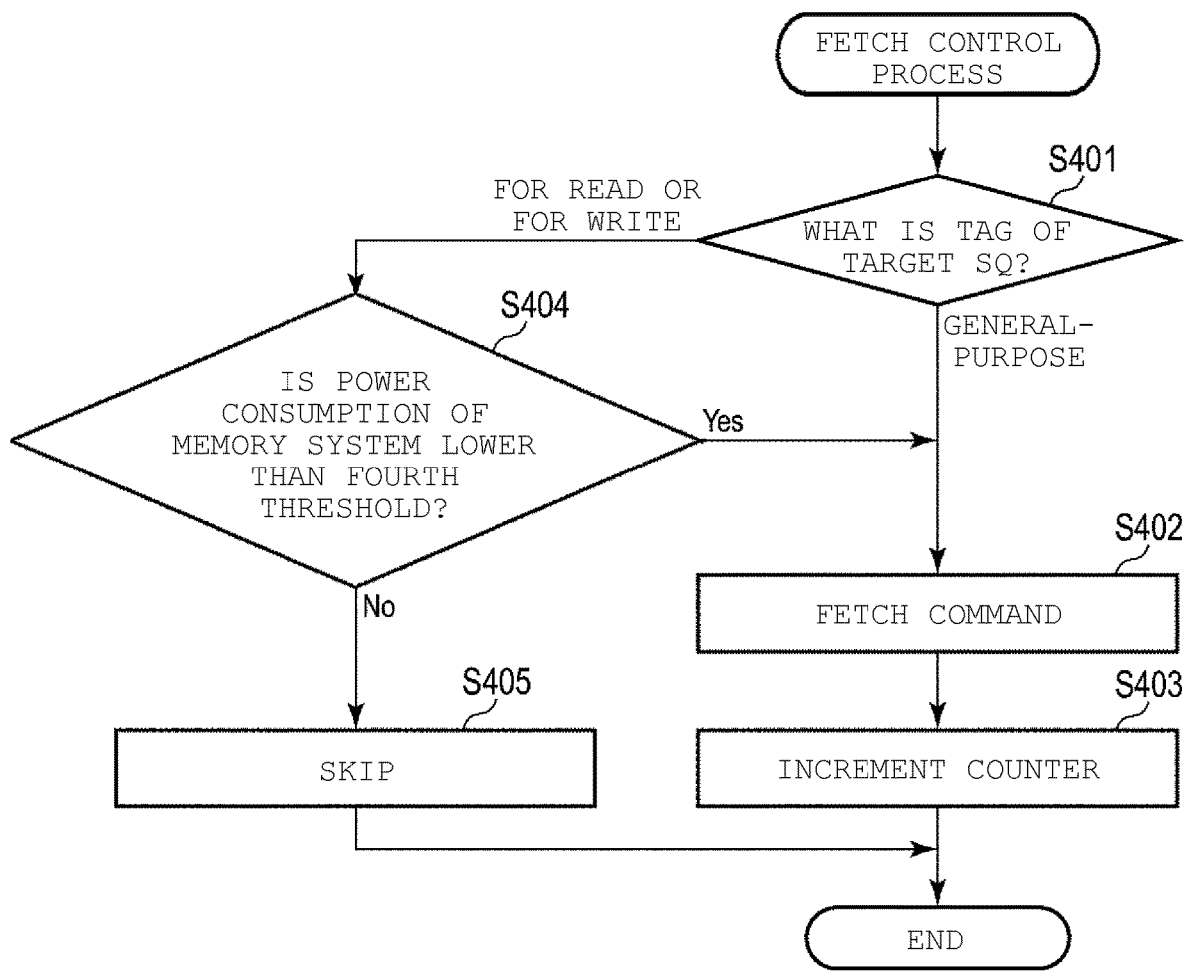

MEMORY SYSTEM WITH CONTROLLER CONFIGURED TO FETCH COMMANDS

CROSS-REFERENCE TO RELATED APPLICATION

This application is based upon and claims the benefit of priority from Japanese Patent Application No. 2023-007399, filed Jan. 20, 2023, the entire contents of which are incorporated herein by reference.

FIELD

Embodiments described herein relate generally to a technique that controls a nonvolatile memory.

BACKGROUND

Recently, a memory system including a nonvolatile memory is widely used. As one of such memory systems, a solid-state drive (SSD) including a NAND flash memory is known.

The memory system selects a command queue from which a command is to be fetched from a plurality of command queues each of which stores a command issued from a host. The memory system fetches a command from the selected command queue. Based on the fetched command, the memory system executes, for example, a process of writing data into a nonvolatile memory or a process of reading data from a nonvolatile memory.

DESCRIPTION OF THE DRAWINGS

FIG. 5 is a diagram illustrating a configuration example of a counter table that is used in the memory system according to at least one embodiment;

FIG. 9 is a diagram illustrating a first example of the counter table that is used in the memory system according to at least one embodiment;

FIG. 10 is a diagram illustrating a second example of the counter table that is used in the memory system according to at least one embodiment;

FIG. 11 is a diagram illustrating a third example of the counter table that is used in the memory system according to the embodiment;

FIG. 12 is a diagram illustrating a fourth example of the counter table that is used in the memory system according to at least one embodiment;

FIG. 13 is a diagram illustrating a fifth example of the counter table that is used in the memory system according to at least one embodiment;

FIG. 14 is a diagram illustrating an example of a submission queue-tag table based on the counter table of FIG. 13 that is used in the memory system according to at least one embodiment;

FIG. 17 is a flowchart illustrating a second example of a procedure of a fetch control process that is executed by a memory system according to a modification example of at least one embodiment.

DETAILED DESCRIPTION

The fetched command may not be suitable for an operation state of the memory system. Then, access performance from the host to the memory system may decrease.

Embodiments provide a memory system capable of improving access performance.

In general, according to at least one embodiment, a memory system is connectable to a host. The memory system includes a nonvolatile memory and a controller. The controller controls the nonvolatile memory. The controller fetches a command from a plurality of command queues each of which stores a command issued from the host to the memory system. The controller executes a process corresponding to the fetched command. The controller estimates a use of each of the plurality of command queues based on types of one or more commands fetched from each of the plurality of command queues. The controller determines a command queue from which a next command is to be fetched from the plurality of command queues based on the use of each of the plurality of command queues and a usage state of a resource in the memory system. The controller fetches a command from the determined command queue.

Hereinafter, an embodiment will be described with reference to the drawings.

Figure 1:
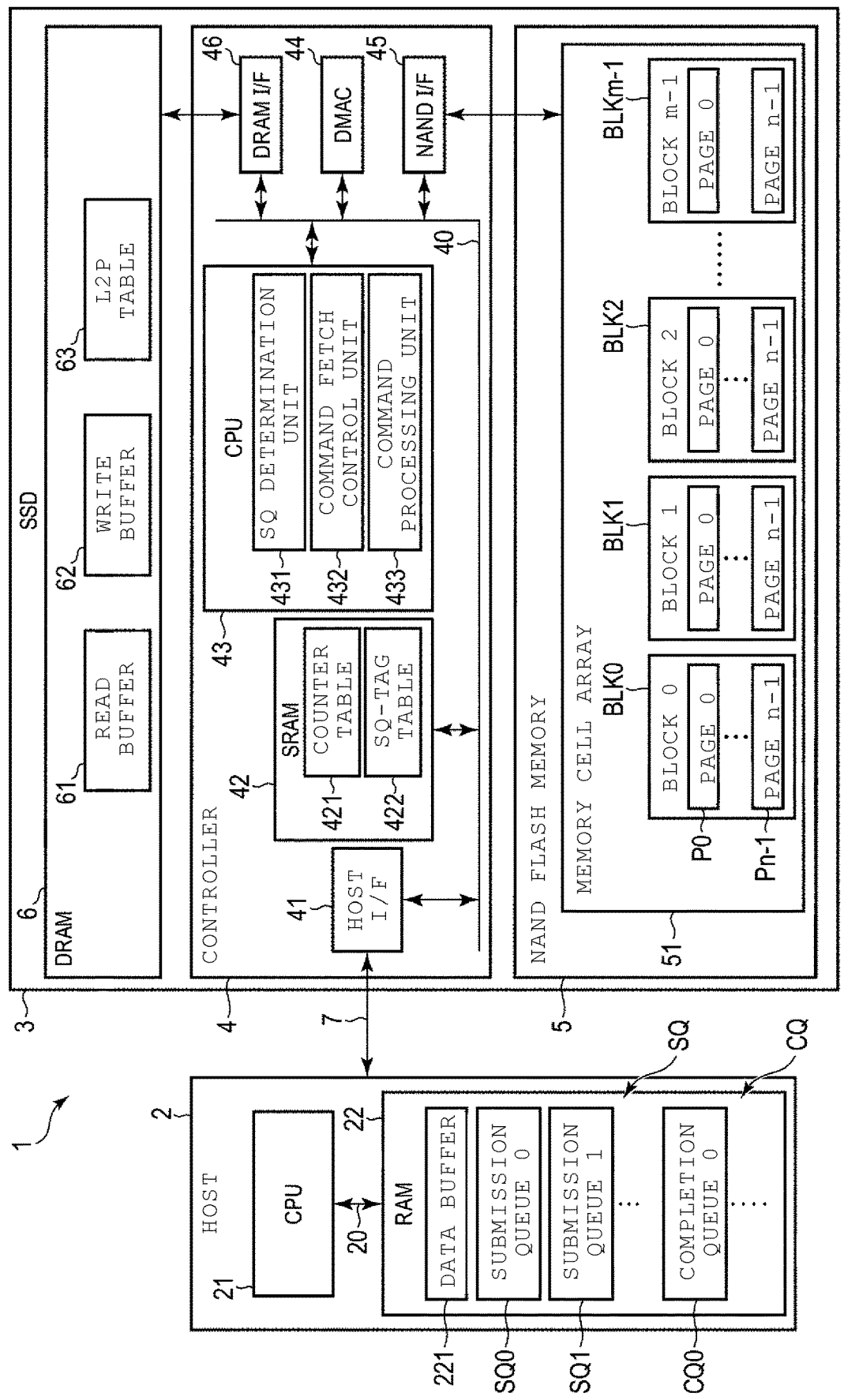
FIG. 1 is a block diagram illustrating a configuration example of an information processing system including a memory system according to at least one embodiment.

Hereinafter, a case where a memory system according to the embodiment is implemented as an SSD is assumed. FIG. 1 is a block diagram illustrating a configuration example of an information processing system 1 including the memory system according to the embodiment. The information processing system 1 includes a host (host device) 2 and a solid-state drive (SSD) 3. The host 2 and the SSD 3 are connectable via a bus 7.

The host 2 is an information processing apparatus. The host 2 is, for example, a personal computer, a server computer, or a mobile terminal. The host 2 accesses the SSD 3. Specifically, the host 2 transmits various commands to the SSD 3. The various commands include, for example, a read command, a write command, a copy command, and a flush command. The read command is a command for reading data. The write command is a command for writing data. The data to be written that is designated by the write command is data that is initially transmitted from the host 2 to the SSD 3. The copy command is a command for copying data. The flush command is a command for nonvolatilizing data. The data to be nonvolatilized that is designated by the flush command is data that was previously transmitted from the host 2 to the SSD 3.

The SSD 3 is a storage device that is connectable to the host 2. The SSD 3 includes a nonvolatile memory. The SSD 3 writes data into the nonvolatile memory. The SSD 3 reads data from the nonvolatile memory.

Communication between the SSD 3 and the host 2 is executed via the bus 7. The bus 7 is a transmission line that connects the host 2 and the SSD 3 to each other. The bus 7 is, for example, a PCI express™ (PCIe™) bus. The PCIe bus is a full duplex transmission line. The full duplex transmission line includes both of a transmission line that transmits data from the host 2 to the SSD 3 and a transmission line that transmits data from the SSD 3 to the host 2.

As a specification of a logical interface for connecting the host 2 and the SSD 3, for example, NVM express™ (NVMe™) specification may be used.

Next, a configuration of the host 2 will be described.

The host 2 includes a central processing unit (CPU) 21 and a random access memory (RAM) 22. The CPU 21 and the RAM 22 are connected to each other via an internal bus 20.

The CPU 21 is, for example, at least one processor. The CPU 21 executes software (host software) loaded to the RAM 22 from the SSD 3 or another storage device connected to the host 2. The host software includes, for example, an operating system (OS), a file system, and an application program.

The RAM 22 is, for example, a volatile memory. The RAM 22 is also called a main memory, a system memory, or a host memory. The RAM 22 is, for example, a dynamic random access memory (DRAM). In a storage area of the RAM 22, a buffer area that is used as a data buffer 221, an area of one or more submission queues SQ, and an area of one or more completion queues CQ are allocated. The one or more submission queues SQ include, for example, submission queues SQ0, SQ1, and . . . . The one or more completion queues CQ include, for example, completion queues CQ0 and . . . . Hereinafter, one submission queue that is not specified among the one or more submission queues SQ is also called the submission queue SQ. One completion queue that is not specified among the one or more completion queues CQ is also called the completion queue CQ.

The data buffer 221 is a storage area that temporarily stores user data to be written into the SSD 3 and user data read from the SSD 3.

The submission queue SQ is a command queue that is used for issuing a command to the SSD 3. The submission queue SQ stores a command issued from the host 2 to the SSD 3. The submission queue SQ includes a plurality of slots each of which can store a command.

The CPU 21 creates the submission queue SQ in the RAM 22. The CPU 21 issues a submission queue creation command to the SSD 3. The submission queue creation command includes, for example, an address representing a storage location in the RAM 22 where the submission queue SQ is created, a size of the submission queue SQ, and identification information of the completion queue CQ correlated to the submission queue SQ. Such information is notified to the SSD 3 according to the submission queue creation command.

The completion queue CQ is a queue that is used for receiving a completion response representing completion of the command from the SSD 3. The completion response includes information representing a status of the completed command. The completion response is also called command completion or command completion notification. The completion queue CQ includes a plurality of slots each of which can store a completion response. The CPU 21 creates the completion queue CQ in the RAM 22 of the host 2. The CPU 21 issues a completion queue creation command to the SSD 3. The completion queue creation command includes, for example, an address representing a storage location in the RAM 22 where the completion queue CQ is stored and a size of the completion queue CQ. Such information is notified to the SSD 3 according to the completion queue creation command. To one completion queue CQ, one submission queue SQ may be correlated or two or more submission queues SQ may be correlated.

In the NVMe interface, communication between the host 2 and the SSD 3 is executed using a pair of queues including at least one submission queue SQ and a completion queue CQ correlated with the at least one submission queue SQ. The pair of queues is called a submission/completion queue pair (SQ/CQ pair).

A use of each of the submission queues SQ may be determined. Here, the host 2 controls a submission queue SQ for one use to store a command of a type corresponding to the use or to preferentially store a command corresponding to the use. For example, a case where a use of the submission queue SQ0 is read and a use of the submission queue SQ1 is write is assumed. Here, for example, the host 2 causes the submission queue SQ0 to preferentially store an issued read command. The host 2 causes the submission queue SQ1 to preferentially store an issued write command.

Next, an internal configuration of the SSD 3 will be described.

The SSD 3 includes a controller 4 and a NAND flash memory 5 (hereinafter, simply referred to as the NAND memory 5). The SSD 3 may further include a RAM, for example, a dynamic random access memory (DRAM) 6.

The controller 4 is a memory controller. The controller 4 is implemented by a control circuit, for example, a system-on-a-chip (SoC). The controller 4 is electrically connected to the NAND memory 5. The controller 4 controls the NAND memory 5. The controller 4 executes an operation of writing data into the NAND memory 5 and an operation of reading data from the NAND memory 5. A function of each unit of the controller 4 may be implemented by dedicated hardware, a processor that executes a program, or a combination thereof. The controller 4 is communicatively connected to the DRAM 6. The controller 4 executes an operation of writing data into the DRAM 6 and an operation of reading data from the DRAM 6. The controller 4 executes communication with the host 2 via the bus 7.

The NAND memory 5 is a nonvolatile memory. The NAND memory 5 includes a memory cell array 51. The memory cell array 51 includes a plurality of memory cells that are located in a matrix configuration. The NAND memory 5 may be a flash memory having a two-dimensional structure or may be a flash memory having a three-dimensional structure.

The memory cell array 51 includes a plurality of blocks BLK0 to BLKm-1. Each of the blocks BLK0 to BLKm-1 includes a plurality of pages P0 to Pn-1. Each of the pages P0 to Pn-1 includes a plurality of memory cells connected to a same word line. Each of the plurality of blocks BLK0 to BLKm-1 functions as a minimum unit of a data erase operation of erasing data. Each of the plurality of pages P0 to Pn-1 functions as a unit of the data write operation and the data read operation.

The DRAM 6 is a volatile memory. In the DRAM 6, for example, a storage area that is used as a read buffer 61, a storage area that is used as a write buffer 62, and a cache area of a logical-to-physical address translation table (L2P table) 63 are provided.

The read buffer 61 is a storage area that temporarily stores data read from the NAND memory 5.

The write buffer 62 is a storage area that temporarily stores data to be written into the NAND memory 5 received from the host 2.

The L2P table 63 is a table that stores mapping information. The mapping information is information representing mapping between each of logical addresses and each of physical addresses of the NAND memory 5 in units of a predetermined management size. The logical address is an address used for the host 2 to access the SSD 3. As the logical address, for example, a logical block address (LBA) is used. The physical address is an address representing a storage location in the NAND memory 5.

Next, an internal configuration of the controller 4 will be described. The controller 4 includes a host interface circuit (host I/F) 41, an SRAM 42, a CPU 43, a direct memory access controller (DMAC) 44, a NAND interface circuit (NAND I/F) 45, and a DRAM interface circuit (DRAM I/F) 46. The host I/F 41, the SRAM 42, the CPU 43, the DMAC 44, the NAND I/F 45, and the DRAM I/F 46 are connected to each other via a bus 40.

The host I/F 41 is a host interface circuit that executes communication with the host 2. The host I/F 41 is, for example, a PCIe controller. The host I/F 41 includes an arbitration mechanism. When the CPU 43 to be described below fetches a command, the arbitration mechanism selects a submission queue SQ from which a next command is to be fetched from the plurality of submission queues SQ0, SQ1, and . . . of the host 2. Hereinafter, the submission queue SQ from which a next command is to be fetched that is selected by the host I/F 41 is also called a target submission queue SQ.

For example, in the NVMe specification, as the arbitration mechanism, a round robin (RR) arbitration mechanism, a weighted round robin (WRR) arbitration mechanism, and a vendor-specific arbitration mechanism are defined. A specific example of the arbitration mechanism will be described below with reference to FIG. 3.

The host I/F 41 notifies which arbitration mechanism is supported among the round robin (RR) arbitration mechanism, the weighted round robin (WRR) arbitration mechanism, and the vendor-specific arbitration mechanism to the host 2. The host 2 that receives the notification freely selects an arbitration mechanism among the arbitration mechanisms that are supported by the host I/F 41. By the host 2 selecting the vendor-specific arbitration mechanism, the host I/F 41 enables the arbitration of the submission queue SQ accompanied by a command fetch and processing operation described below.

The SRAM 42 is a volatile memory. A storage area of the SRAM 42 is used as a work area of the CPU 43. For example, in the storage area of the SRAM 42, a storage area of a counter table 421 and a storage area of an SQ-tag table 422 are allocated.

The counter table 421 is a table for managing the number of commands fetched from the submission queue SQ based on types of the commands. A specific configuration of the counter table 421 will be described below with reference to FIG. 5.

The SQ-tag table 422 is a table for managing tags correlated to each of the plurality of submission queues SQ. The tags correlated to each of the plurality of submission queues SQ are determined, for example, based on the counter table 421. The SQ-tag table 422 manages a correspondence between the submission queue SQ and the tag determined for the submission queue SQ. A specific configuration of the SQ-tag table 422 will be described below with reference to FIG. 4.

The CPU 43 is, for example, at least one processor. The CPU 43 controls the host I/F 41, the SRAM 42, the DMAC 44, the NAND I/F 45, and the DRAM I/F 46. The CPU 43 loads a control program (firmware) stored in the NAND memory 5 or a ROM (not illustrated) to the DRAM 6. The CPU 43 executes various processes by executing the loaded firmware. The firmware may be loaded to the SRAM 42.

For example, as a flash translation layer (FTL), the CPU 43 executes management of data stored in the NAND memory 5 and management of blocks in the NAND memory 5. The management of the data includes management of mapping information representing a correspondence between each of logical addresses and each of physical addresses. The CPU 43 manages the correspondence between each of logical addresses and each of physical addresses using the L2P table 63. The management of blocks in the NAND memory 5 includes management of defective blocks in the NAND memory 5, wear leveling, and garbage collection (compaction).

The DMAC 44 is a circuit that executes direct memory access. The DMAC 44 executes data transmission between the RAM 22 of the host 2 and the SRAM 42 or the DRAM 6. For example, the DMAC 44 transmits data stored in the read buffer 61 to the data buffer 221. The DMAC 44 transmits data stored in the data buffer 221 to the write buffer 62.

The NAND I/F 45 electrically connects the controller 4 and the NAND memory 5 to each other. The NAND I/F 45 corresponds to an interface specification such as Toggle DDR or open NAND flash interface (ONFI).

The NAND I/F 45 is a circuit that controls the NAND memory 5. When the NAND memory 5 is configured with a plurality of NAND flash memory chips (NAND flash memory dice), the NAND I/F 45 is connected to each of the NAND flash memory chips via a plurality of channels (Ch).

The DRAM I/F 46 is a circuit that controls access to the DRAM 6.

Next, a functional configuration of the CPU 43 will be described. The CPU 43 functions as an SQ determination unit 431, a command fetch control unit 432, and a command processing unit 433. The CPU 43 functions as each of the units, for example, by executing the firmware. Some or all of the SQ determination unit 431, the command fetch control unit 432, and the command processing unit 433 may be implemented by dedicated hardware in the controller 4. For example, the command fetch control unit 432 may be implemented by the host I/F 41.

The SQ determination unit 431 estimates the use of each of the plurality of submission queues SQ using the counter table 421. Specifically, the SQ determination unit 431 acquires, for each of the types of the commands, the number of one or more commands fetched from each of the plurality of submission queues SQ using the counter table 421. The SQ determination unit 431 estimates the use of each of the plurality of submission queues SQ based on the number of commands acquired for each of the types.

The command fetch control unit 432 controls the fetching of a command from the target submission queue SQ via the host I/F 41. The command fetch control unit 432 determines a submission queue SQ from which a command is to be fetched based on the use of each of the plurality of submission queues SQ and a usage state of a resource in the SSD 3. The resource of the SSD 3 is, for example, a write buffer or a read buffer. For example, when the target submission queue SQ is the submission queue SQ0, the command fetch control unit 432 determines whether to fetch a command from the submission queue SQ0 based on the use of the submission queue SQ0 and the usage state of the resource in the SSD 3. The command fetch control unit 432 fetches a command from the target submission queue SQ that is determined to be the target from which a command is to be fetched. The command fetch control unit 432 transmits the fetched command to the command processing unit 433.

Here, the case where the fetching of commands from the plurality of submission queues SQ of the host 2 is controlled by the SQ determination unit 431 and the command fetch control unit 432 is described. However, the fetching of commands from a plurality of command queues (not illustrated) of the SSD 3 may be controlled instead of from the plurality of submission queues SQ of the host 2. The plurality of command queues of the SSD 3 are, for example, queues that temporarily store the commands fetched from the plurality of submission queues SQ of the host 2. Here, the SQ determination unit 431 manages the number of commands fetched from the plurality of command queues of the SSD 3 using the counter table 421 based on the types of the commands. The SQ-tag table 422 manages the tags correlated to each of the plurality of command queues of the SSD 3.

The command processing unit 433 interprets each of the fetched commands, and executes a process corresponding to the fetched command. When the process corresponding to the fetched command is completed, the command processing unit 433 transmits a completion response representing completion of the command to the host 2 via the host I/F 41. The command processing unit 433 stores the completion response in the completion queue CQ correlated to the target submission queue SQ.

More specific operations of the SQ determination unit 431, the command fetch control unit 432, and the command processing unit 433 will be described below with reference to FIGS. 7 to 14.

Next, a command process of the information processing system 1 will be described. The command process includes a procedure of issuing a command from the host 2 to the SSD 3 and subsequently causing the host 2 to process a completion response corresponding to the command.

Figure 2:
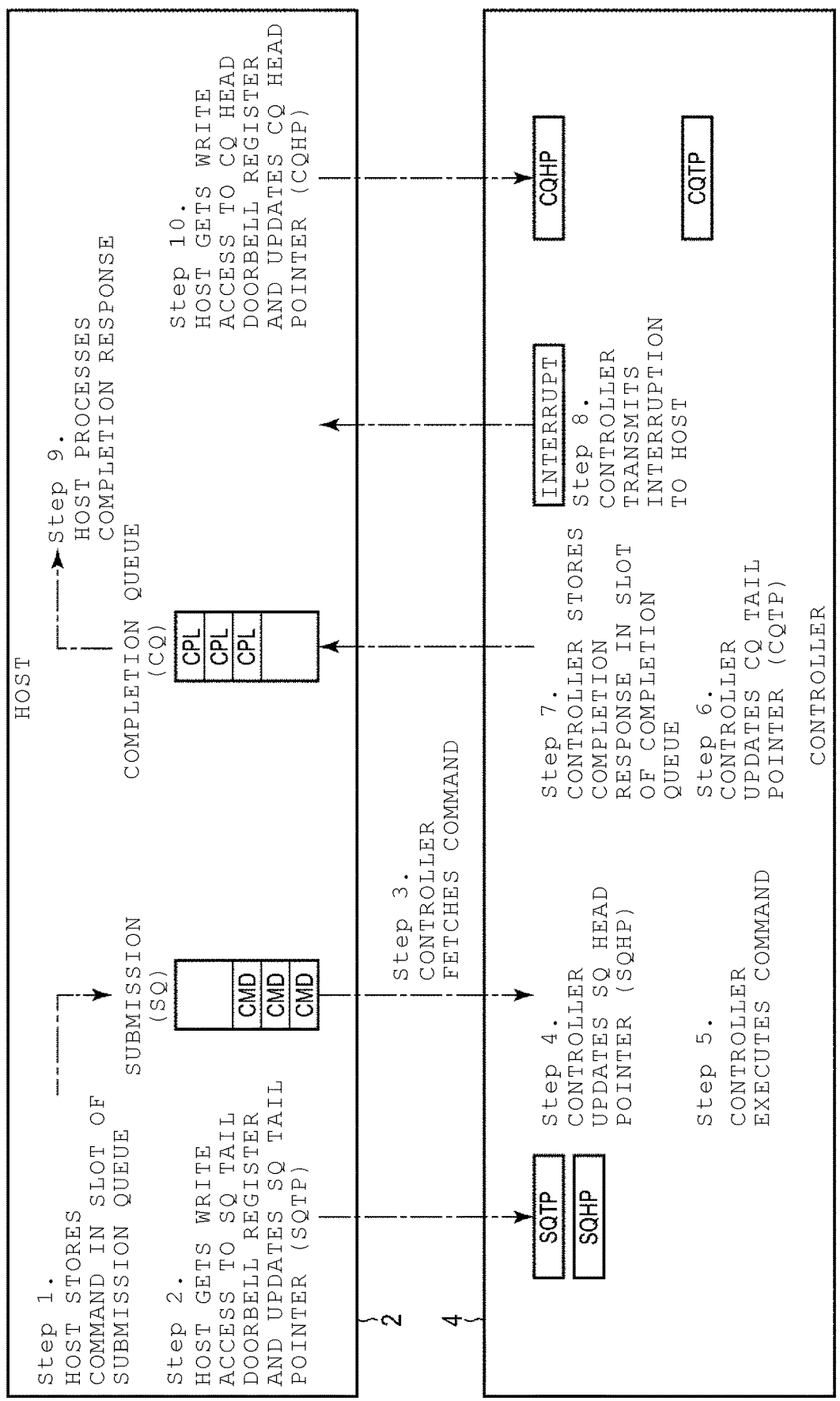
FIG. 2 is a diagram illustrating an example of a procedure of a command process that is executed by the information processing system including the memory system according to at least one embodiment.

FIG. 2 is a diagram illustrating an example of the procedure of the command process that is executed by the information processing system 1.

Step 1: The host 2 stores one or more new commands to be transmitted to the SSD 3 in one or more free slots of the submission queue SQ. The one or more new commands are stored in one or more free slots starting from a slot represented by a current value of a submission queue tail pointer (SQTP). The new command stored in the submission queue SQ may be a write command, may be a read command, or may be another command. In FIG. 2, each of the commands stored in the submission queue SQ is represented by "CMD".

Step 2: To notify the storage of the one or more new commands in the submission queue SQ to the controller 4 of the SSD 3, The host 2 gets write access to a submission queue tail doorbell register in the SSD 3 corresponding to the submission queue SQ, and updates a value of the submission queue tail pointer (SQTP) corresponding to the submission queue SQ. The value of the submission queue tail pointer (SQTP) is incremented by the number of new commands stored in the submission queue SQ. The update of the submission queue tail pointer (SQTP) is a trigger for the controller 4 to start the process of each of the commands stored in the submission queue SQ.

Step 3: The controller 4 can recognize the number of new commands stored in the submission queue SQ based on a difference between the new value of the submission queue tail pointer (SQTP) and the value of a submission queue head pointer (SQHP). The controller 4 fetches any number of one or more commands from the submission queue SQ. Each of the fetched commands is temporarily stored in the SRAM 42 of the controller 4.

Step 4: The controller 4 updates the value of the submission queue head pointer (SQHP) corresponding to the submission queue SQ such that the value of the submission queue head pointer (SQHP) is increased by the number of commands fetched in Step 3.

Step 5: The controller 4 executes each of the fetched commands. The order in which the commands are executed is not limited, and the commands may be executed in a different order from the order in which the commands were fetched. In the process of executing each of the commands, the controller 4 executes transmission of data from the data buffer 221 of the host 2 to the write buffer 62 of the controller 4 or transmission of data from the read buffer 61 to the data buffer 221 of the host 2 as needed.

Step 6: When execution of one command is completed, first, the controller 4 updates a completion queue tail pointer (CQTP) corresponding to the completion queue CQ correlated to the submission queue SQ from which the completed command is fetched, and increases the value of the completion queue tail pointer (CQTP) by one.

Step 7: the controller 4 stores a new completion response representing a status of the completed command in the next free slot of the completion queue CQ. In FIG. 2, each of the completion responses stored in the completion queue CQ is represented by "CPL".

Step 8: The controller 4 transmits an interruption to the host 2. The controller 4 transmits an interruption including an interruption vector corresponding to the completion queue CQ where the completion response is stored in Step 7 to the host 2. The controller 4 notifies the storage of the new completion response in the completion queue CQ to the host 2.

Step 9: The host 2 acquires a completion response from a CQ slot represented by a current value of the completion queue head pointer (CQHP), and processes the acquired completion queue.

Step 10: The host 2 gets write access to a completion queue head doorbell register in the SSD 3 corresponding to the completion queue CQ, and updates the value of the completion queue head pointer (CQHP). The value of the completion queue head pointer (CQHP) is incremented by the number of completion responses processed in Step 9.

When a plurality of submission queues SQ are provided in the host 2, one submission queue SQ from which a command is to be fetched in Step 3 of FIG. 2 described above is determined by the arbitration operation.

Figures 3A, 3B, 4:
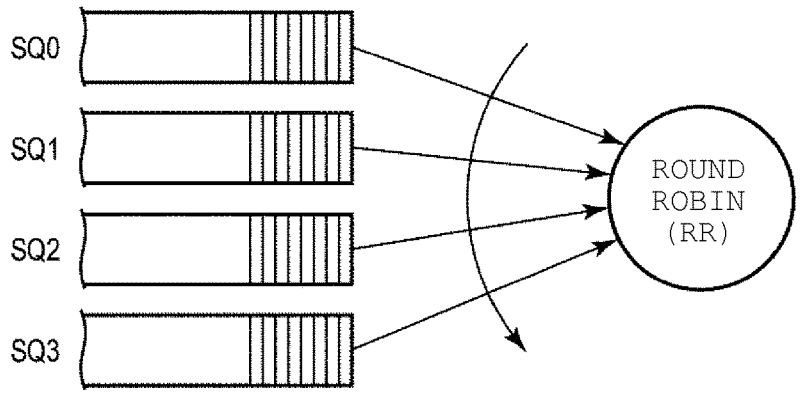
FIG. 3A is a diagram illustrating an arbitration operation that is executed by the memory system according to at least one embodiment.
FIG. 3B is a diagram illustrating an example of submission queues that are selected by the arbitration operation.
FIG. 4 is a diagram illustrating a configuration example of a submission queue-tag table that is used in the memory system according to at least one embodiment.

FIG. 3A is a diagram illustrating the arbitration operation that is executed by the SSD 3 and FIG. 3B is a diagram illustrating an example of submission queues SQ that are selected by the arbitration operation. Here, a case where the arbitration operation is based on the round robin arbitration mechanism will be described as an example. It is assumed that four submission queues SQ0, SQ1, SQ2, and SQ3 are provided in the host 2.

As illustrated in FIG. 3A, in the round robin arbitration mechanism, the four submission queues SQ0, SQ1, SQ2, and SQ3 are handled with equal priorities. The controller 4 sequentially selects one of the submission queues SQ0, SQ1, SQ2, and SQ3 per round.

Specifically, as illustrated in FIG. 3B, the controller 4 selects each of the submission queues as the submission queue SQ to be fetched in order of the submission queues SQ0, SQ1, SQ2, and SQ3. After the controller 4 selected the submission queue SQ3 as the submission queue SQ to be fetched, the submission queue SQ to be fetched is selected again in order from the submission queue SQ0.

The controller 4 can fetch N commands from the submission queue SQ to be fetched. N represents an integer of 1 or more.

Accordingly, for example, the controller 4 fetches N commands from the submission queue SQ0. Next, the controller 4 fetches N commands from the submission queue SQ1. The controller 4 fetches N commands from the submission queue SQ2. The controller 4 fetches N commands from the submission queue SQ3. The controller 4 fetches N commands again from the submission queue SQ0.

Due to the above-described operation, the controller 4 can fetch a command from the submission queue SQ to be fetched by handling the plurality of submission queues SQ with equal priorities.

Here, configurations of the tables used in the SSD 3 will be described.

First, the SQ-tag table 422 will be described. FIG. 4 illustrates a configuration example of the SQ-tag table 422 used in the SSD 3.

The SQ-tag table 422 includes a plurality of entries corresponding to the plurality of submission queues SQ, respectively. Each of the plurality of entries includes an SQ identification information field and a tag field.

The SQ identification information field represents identification information of the corresponding submission queue SQ. One submission queue SQ can be specified among the plurality of submission queues SQ based on the identification information of the submission queue SQ.

The tag field represents a tag correlated to the corresponding submission queue SQ. The tag is information representing the use of the corresponding submission queue SQ. The information representing the use of the submission queue SQ includes information representing a tendency of types of commands stored in the submission queue SQ. More specifically, in the tag field, for example, any one tag among for read, for write, and general-purpose is set.

The tag representing for read represents that a command that newly uses the read buffer 61 tends to be stored in the corresponding submission queue SQ. That is, the submission queue SQ correlated to the tag representing for read is a submission queue SQ that is estimated to be used to mainly store commands that newly use the read buffer 61. The command that newly uses the read buffer 61 is, for example, a read command or a copy command.

In an operation corresponding to the read command, user data is read from the NAND memory 5, and the read user data is stored in an available area of the read buffer 61. The storage area in the read buffer 61 where the user data is stored is a using storage area until the user data is transmitted to the host 2. Accordingly, the read command is a command that newly uses the read buffer 61.

The tag representing for write represents that a command that newly uses the write buffer 62 tends to be stored in the corresponding submission queue SQ. That is, the submission queue SQ correlated to the tag representing for write is a submission queue SQ that is estimated to be used to mainly store commands that newly use the write buffer 62. The command that newly uses the write buffer 62 is, for example, a write command or a copy command.

In an operation corresponding to the write command, user data to be written into the NAND memory 5 is received from the host 2, and the received user data is temporarily stored in an available area of the write buffer 62. The storage area in the write buffer 62 where the user data is stored is a using storage area until the operation of writing the user data into the NAND memory 5 is completed. Accordingly, the write command is a command that newly uses the storage area of the write buffer 62.

In an operation corresponding to the copy command, user data is read from the NAND memory 5, and the read user data is stored in an available area of the read buffer 61. The stored user data is further stored in (moved to) an available area of the write buffer 62. The storage area in the read buffer 61 where the user data is stored is a using storage area until the user data is moved to the write buffer 62. The storage area in the write buffer 62 where the user data is stored is a using storage area until the operation of writing the user data into the NAND memory 5 is completed. Accordingly, the copy command is a command that newly uses the storage area of the read buffer 61 and also newly uses the storage area of the write buffer 62.

The tag representing general-purpose represents a command that does not newly use any of the read buffer 61 and the write buffer 62 tends to be stored. That is, the submission queue SQ correlated to the tag representing general-purpose is a submission queue SQ that is estimated to be used to mainly store commands that do not newly use any of the read buffer 61 and the write buffer 62. The command that does not newly use any of the read buffer 61 and the write buffer 62 is, for example, a flush command.

In an operation corresponding to the flush command, data that was previously stored in the write buffer 62 is written into the NAND memory 5. Accordingly, the flush command is a command that does not newly use any of the read buffer 61 and the write buffer 62.

In the example of the SQ-tag table 422 illustrated in FIG. 4, the submission queue SQ0 is correlated to the tag representing for read. The submission queue SQ1 is correlated to the tag representing for write. Each of the submission queue SQ2 and the submission queue SQ3 is correlated to the tag representing general-purpose.

In an initial state immediately after creating the plurality of submission queues SQ, in the SQ-tag table 422, the tags correlated to all submission queues SQ are, for example, tags representing general-purpose.

Next, the counter table 421 will be described. FIG. 5 illustrates a configuration example of the counter table 421 used in the SSD 3.

The counter table 421 is a table for managing a plurality of counters corresponding to each of the plurality of submission queues SQ. The plurality of counters corresponding to each of the submission queues SQ correspond to the plurality of tags that can be correlated to the above-described submission queue SQ, respectively. Accordingly, the number of counters corresponding to each of the submission queues SQ corresponds to the number of above-described tags. The plurality of counters corresponding to each of the submission queues SQ may be counters for each of commands defined by NVMe specification.

For example, when the plurality of tags that can be correlated to the submission queue SQ are three tags including for read, for write, and general-purpose, the counter table 421 includes three counters corresponding to the three tags for each of the submission queues SQ, respectively. The three counters include a first read counter #Reads, a first write counter #Writes, and a first general-purpose counter #Non-RWs.

The first read counter #Reads counts commands that newly use the read buffer 61. The first read counter #Reads is incremented by the command fetch control unit 432 when a command that newly uses the read buffer 61 is fetched from the corresponding submission queue SQ. For example, when one command is fetched, 1 is added to the first read counter #Reads.

The first write counter #Writes counts commands that newly use the write buffer 62. The first write counter #Writes is incremented by the command fetch control unit 432 when a command that newly uses the write buffer 62 is fetched from the corresponding submission queue SQ.

The first general-purpose counter #Non-RWs counts commands that do not newly use any of the read buffer 61 and the write buffer 62. The first general-purpose counter #Non-RWs is incremented by the command fetch control unit 432 when a command that does not newly use any of the read buffer 61 and the write buffer 62 is fetched from the corresponding submission queue SQ.

In the example illustrated in FIG. 5, the value of the first read counter #Reads corresponding to the submission queue SQ0 is 100. The value of the first write counter #Writes corresponding to the submission queue SQ0 is 5. The value of the first general-purpose counter #Non-RWs corresponding to the submission queue SQ0 is 10.

The first read counter #Reads corresponding to the submission queue SQ1 is 20. The first write counter #Writes corresponding to the submission queue SQ1 is 90. The first general-purpose counter #Non-RWs corresponding to the submission queue SQ1 is 5.

The first read counter #Reads corresponding to the submission queue SQ2 is 30. The first write counter #Writes corresponding to the submission queue SQ2 is 30. The first general-purpose counter #Non-RWs corresponding to the submission queue SQ2 is 55.

The configurations of the counter table 421 and the counters corresponding to each of the submission queue SQ are not limited to the above-described example as long as the number of one or more commands per type fetched from each of the plurality of submission queues SQ can be acquired by the configurations.

Figure 6:
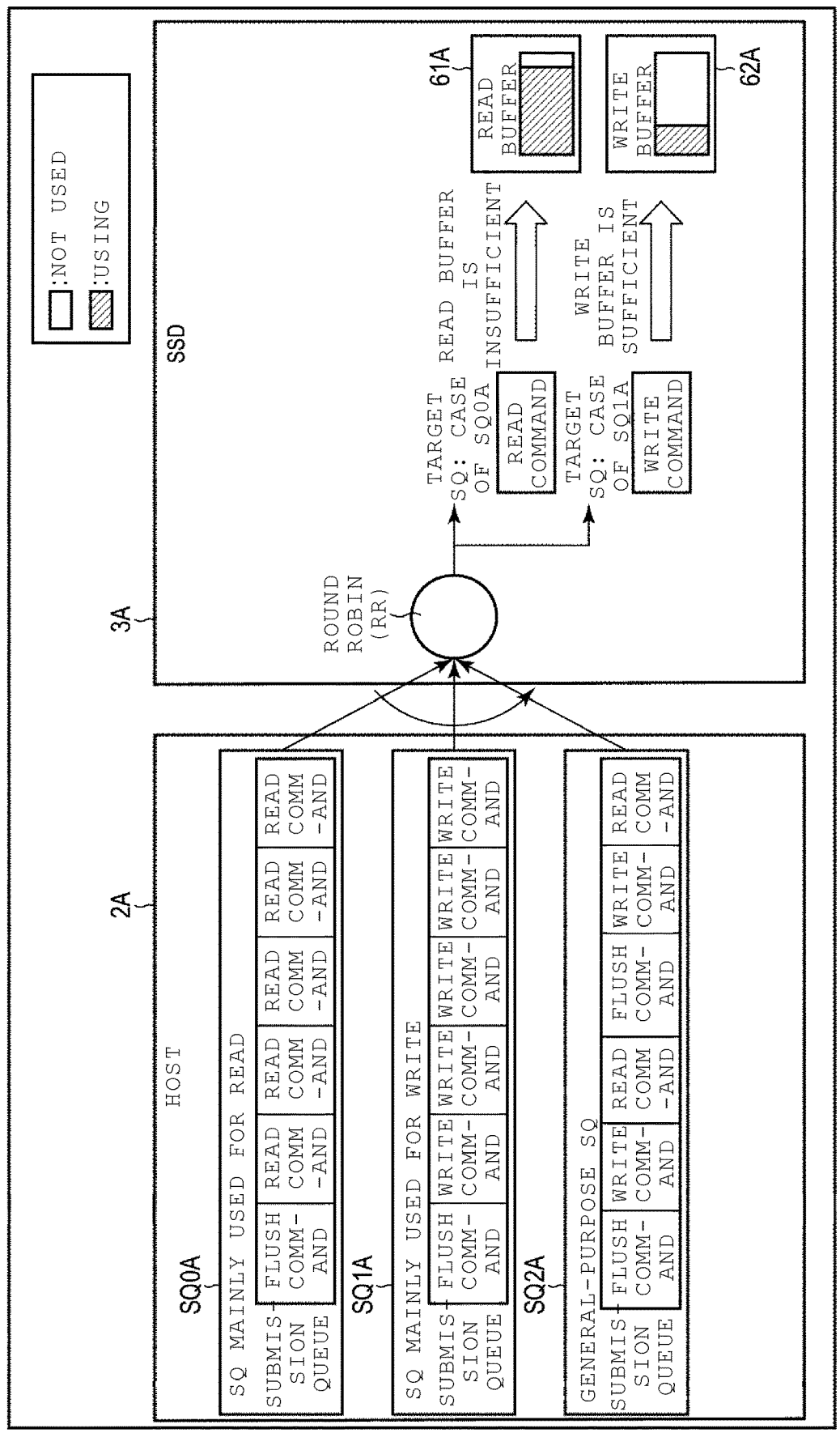
FIG. 6 is a diagram illustrating commands fetched from submission queues in a memory system according to a comparative example.

Here, commands fetched from a submission queue SQA in an SSD 3A according to a comparative example will be described with reference to FIG. 6. In the SSD 3A, a read buffer 61A and a write buffer 62A are provided. The SSD 3A is connected to a host 2A. In the host 2A, three submission queue SQ0A, SQ1A, and SQ2A are provided.

Here, it is assumed that the submission queue SQ0A mainly stores read commands, the submission queue SQ1A mainly stores write commands, and the submission queue SQ2A stores various commands. It is assumed that an available area of the read buffer 61A needed for a process corresponding to the read command is insufficient and an available area of the write buffer 62A needed for a process corresponding to the write command is sufficient.

A controller of the SSD 3A selects, for example, a submission queue SQA to be fetched from the submission queues SQ0A, SQ1A, and SQ2A according to the round robin arbitration mechanism.

When the submission queue SQ0A is selected as the submission queue SQA to be fetched, the controller fetches a read command at the head of the submission queue SQ0A. When the available area of the read buffer 61A is insufficient (for example, when the size of the available area of the read buffer 61A is less than the size of user data read from a NAND memory according to the fetched read command), the controller cannot start the process corresponding to the fetched read command until the available area of the read buffer 61A is sufficiently allocated. Therefore, access performance from the host 2A to the SSD 3A decreases.

The submission queue SQ0A mainly stores read commands. Therefore, the command fetched from the submission queue SQ0A is likely to be a read command. Accordingly, when the available area of the read buffer 61A is insufficient and a command is fetched from the submission queue SQ0A, the access performance from the host 2A to the SSD 3A decreases.

Meanwhile, when the submission queue SQ1A is selected as the submission queue SQA to be fetched, the controller fetches a write command at the head of the submission queue SQ1A. When the available area of the write buffer 62A is sufficient (for example, when the size of the available area of the write buffer 62A is more than the size of user data to be written into the NAND memory according to the fetched write command), the controller can store the user data to be written in the write buffer 62A.

The submission queue SQ1A mainly stores write commands. Therefore, the command fetched from the submission queue SQ1A is likely to be a write command. Accordingly, when the available area of the write buffer 62A is sufficient, it is desirable to fetch a command from the submission queue SQ1A.

As such, when the available area of the read buffer 61A is insufficient, the available area of the write buffer 62A is sufficient and a read command is fetched, there is a concern that a period of time required to complete the process corresponding to the read command increases. That is, here, it is desirable to avoid the fetching of a command from the submission queue SQ0A that is likely to store a read command.

Therefore, the SSD 3 according to the embodiment is controlled such that a command suitable for the usage state of the resource in the SSD 3 is fetched from the submission queue SQ. Specifically, for example, when the submission queue SQ to be fetched is the submission queue SQ where commands that newly use the read buffer 61 are mainly stored and the available area of the read buffer 61 is sufficient, a command is fetched from the submission queue SQ. When the submission queue SQ to be fetched is the submission queue SQ where commands that newly use the read buffer 61 are mainly stored and the available area of the read buffer 61 is insufficient, a command is not fetched from the submission queue SQ. When the submission queue SQ to be fetched is the submission queue SQ where commands that newly use the write buffer 62 are mainly stored and the available area of the write buffer 62 is sufficient, a command is fetched from the submission queue SQ. When the submission queue SQ to be fetched is the submission queue SQ where commands that newly use the write buffer 62 are mainly stored and the available area of the write buffer 62 is insufficient, a command is not fetched from the submission queue SQ. When the submission queue SQ to be fetched is the submission queue SQ where commands that do not newly use any of the read buffer 61 and the write buffer 62 are mainly stored, a command is fetched from the submission queue SQ. As a result, the access performance from the host 2 to the SSD 3 can be improved.

Figure 7:
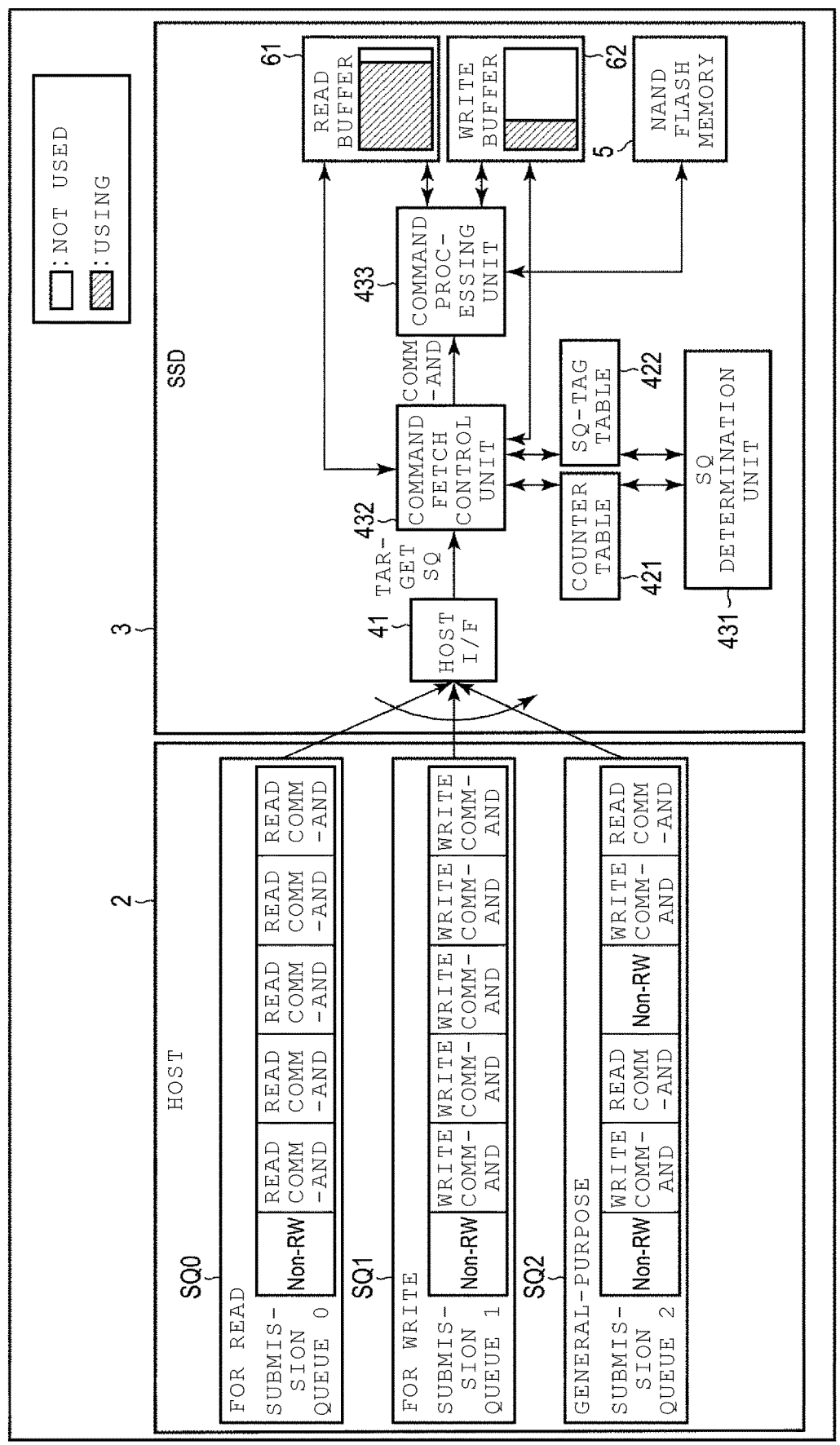
FIG. 7 is a diagram illustrating a command fetch and processing operation that is executed by the memory system according to at least one embodiment.

FIG. 7 is a diagram illustrating an example of a command fetch and processing operation that is executed in the SSD 3.

First, the host I/F 41 selects the submission queue SQ to be fetched from the plurality of submission queues SQ according to the arbitration mechanism (here, the round robin arbitration mechanism). Hereinafter, the selected submission queue SQ to be fetched will be referred to as the target submission queue SQ. The host I/F 41 notifies information representing the target submission queue SQ to the command fetch control unit 432.

The command fetch control unit 432 specifies an entry corresponding to the target submission queue SQ in the SQ-tag table 422 based on the notification from the host I/F 41. The command fetch control unit 432 acquires a tag from the specified entry.

Next, the command fetch control unit 432 acquires the usage state of the resource in the SSD 3. The usage state of the resource in the SSD 3 includes an index regarding the available area of the read buffer 61 and an index regarding the available area of the write buffer 62. The usage state of the resource in the SSD 3 may include power consumption of the SSD 3. The available area of the read buffer 61 is a storage area that can newly store read data in a storage area allocated as the read buffer 61. As the index regarding the available area of the read buffer 61, for example, the size of the available area or a ratio of the available area to the entire storage area of the read buffer 61 is used. The available area of the write buffer 62 is a storage area that can newly store write data in a storage area allocated as the write buffer 62. As the index regarding the available area of the write buffer 62, for example, the size of the available area or a ratio of the available area to the entire storage area of the write buffer 62 is used.

The command fetch control unit 432 determines whether to fetch a command from the target submission queue SQ based on the acquired tag and the usage state of the resource in the SSD 3.

Specifically, when the acquired tag is for read, the command fetch control unit 432 acquires the index regarding the available area of the read buffer 61. The command fetch control unit 432 controls whether to fetch a command from the target submission queue SQ based on the index regarding the available area of the read buffer 61. Specifically, when the target submission queue SQ is the submission queue SQ0 and the index regarding the available area of the read buffer 61 is a second threshold or more, the command fetch control unit 432 fetches a command from the submission queue SQ0. When the index regarding the available area of the read buffer 61 is less than the second threshold, the command fetch control unit 432 skips the fetching of a command from the submission queue SQ0. Then, the command fetch control unit 432 requests the host I/F 41 to select the submission queue SQ from which a next command is to be fetched.

When the acquired tag is for write, the command fetch control unit 432 acquires the index regarding the available area of the write buffer 62. The command fetch control unit 432 controls whether to fetch a command from the target submission queue SQ based on the index regarding the available area of the write buffer 62. Specifically, when the target submission queue SQ is the submission queue SQ1 and the index regarding the available area of the write buffer 62 is a third threshold or more, the command fetch control unit 432 fetches a command from the submission queue SQ1. When the index regarding the available area of the write buffer 62 is less than the third threshold, the command fetch control unit 432 skips the fetching of a command from the submission queue SQ1. Then, the command fetch control unit 432 requests the host I/F 41 to select the submission queue SQ from which a next command is to be fetched.

When the acquired tag is general-purpose, the command fetch control unit 432 fetches a command from the target submission queue SQ. The reason is that the submission queue SQ correlated to the tag representing general-purpose mainly stores commands that do not newly use any of the read buffer 61 and the write buffer 62.

When the command fetch control unit 432 fetches a command from the target submission queue SQ, the command fetch control unit 432 updates the counter table 421 based on the type of the fetched command. Specifically, when the fetched command is a command that newly uses the read buffer 61, the command fetch control unit 432 increments the first read counter #Reads corresponding to the target submission queue SQ in the counter table 421. When the fetched command is a command that newly uses the write buffer 62, the command fetch control unit 432 increments the first write counter #Writes corresponding to the target submission queue SQ in the counter table 421. When the fetched command is a command that does not newly use any of the read buffer 61 and the write buffer 62, the command fetch control unit 432 increments the first general-purpose counter #Non-RWs corresponding to the target submission queue SQ in the counter table 421.

The command fetch control unit 432 transmits the fetched command to the command processing unit 433.

The command processing unit 433 executes a process corresponding to the fetched command. For example, the command processing unit 433 reads user data from the NAND memory 5 according to the read command, and stores the read user data in the read buffer 61. The command processing unit 433 stores user data to be written into the NAND memory 5 in the write buffer 62 according to the write command, and writes the user data into the NAND memory 5. The command processing unit 433 writes non-written user data that was previously stored in the write buffer 62 into the NAND memory 5 according to the flush command. When the process corresponding to the command is completed, the command processing unit 433 stores a completion response in the completion queue CQ corresponding to the target submission queue SQ via the host I/F 41.

The SQ determination unit 431 estimates the use of each of the plurality of submission queues SQ based on the counter table 421, and updates the SQ-tag table 422. When a total number of commands fetched from the plurality of submission queues SQ reaches a first threshold after a specific timing or when a first time elapses from a specific timing, the SQ determination unit 431 estimates the use of each of the plurality of submission queues SQ based on the counter table 421. Any value may be set to each of the first threshold and the first time. By setting the first threshold and the first time, a timing of estimating the use of each of the plurality of submission queues SQ can be controlled. The specific timing is, for example, the time at which all counters in the counter table 421 were just reset (for example, were set to 0 as an initial value).

When the use of each of the plurality of submission queues SQ is estimated, the SQ determination unit 431 resets the counter table 421. Next, when the total number of commands fetched from the plurality of submission queues SQ reaches the first threshold or when the first time elapses, the SQ determination unit 431 estimates the use of each of the plurality of submission queues SQ based on the counter table 421 again. As a result, the use of the submission queue SQ is estimated again and the latest use is appropriately estimated at every given interval.

Instead of estimating the use of each of the plurality of submission queues SQ, the controller 4 may acquire the use of each of the plurality of submission queues SQ from the host 2 and may update the SQ-tag table 422. The use of each of the submission queues SQ may be determined between a vendor of the host 2 and a vendor of the SSD 3 as a product specification of the host 2 and the SSD 3. The SQ determination unit 431 may estimate again the use acquired from the host 2 or the use determined as the product specification at any interval. The any interval is whenever the total number of commands fetched from the plurality of submission queues SQ reaches the first threshold or whenever the first time elapses.

In FIG. 7, the submission queue SQ0 tends to preferentially store a read command, the submission queue SQ1 tends to preferentially store a write command, and the submission queue SQ2 tends to preferentially store a flush command. FIG. 7 illustrates a case where the available area of the read buffer 61 is insufficient and the available area of the write buffer 62 is sufficient.

Here, when the submission queue SQ0 is selected as the target submission queue SQ, the host I/F 41 notifies information representing the submission queue SQ0 to the command fetch control unit 432.

The command fetch control unit 432 receives the notification and acquires a tag corresponding to the submission queue SQ0 from the SQ-tag table 422. The acquired tag represents for read.

The command fetch control unit 432 acquires the size of the available area of the read buffer 61.

As the available area of the read buffer 61 is insufficient and the tag of the target submission queue SQ represents for read, the command fetch control unit 432 skips the fetching of a command from the submission queue SQ0. The command fetch control unit 432 requests the host I/F 41 to select the submission queue SQ from which a next command is to be fetched.

When the submission queue SQ1 is selected as the target submission queue SQ, the host I/F 41 notifies information representing the submission queue SQ1 to the command fetch control unit 432.

The command fetch control unit 432 receives the notification and acquires a tag corresponding to the submission queue SQ1 from the SQ-tag table 422. The acquired tag represents for write.

The command fetch control unit 432 acquires the size of the available area of the write buffer 62.

As the available area of the write buffer 62 is sufficient and the tag of the target submission queue SQ represents for write, the command fetch control unit 432 fetches a command from the submission queue SQ1.

When the submission queue SQ2 is selected as the target submission queue SQ, the host I/F 41 notifies information representing the submission queue SQ2 to the command fetch control unit 432.

The command fetch control unit 432 receives the notification and acquires a tag corresponding to the submission queue SQ2 from the SQ-tag table 422. The acquired tag represents general-purpose.

When the tag of the target submission queue SQ2 represents general-purpose, the command fetch control unit 432 fetches a command from the submission queue SQ2.

As such, the controller 4 can determine whether to fetch a command from the target submission queue SQ based on the usage state of the resource in the SSD 3 and the tag corresponding to each of the submission queues SQ. As a result, the controller 4 can select the submission queue SQ from which a command suitable for the usage state of the resource in the SSD 3 is likely to be fetched, and the controller 4 can fetch a command.

The operation of estimating the use of the submission queue SQ will be described with reference to FIGS. 8 to 14. Here, a case where the submission queues SQ provided in the host 2 are the submission queue SQ0 and the submission queue SQ1 will be described. Then, the submission queue SQ0 and the submission queue SQ1 are alternately selected as the submission queue SQ to be fetched. It is assumed that counters corresponding to each of the submission queues SQ0 and SQ1 include the first read counter, the first write counter, and the first general-purpose counter.

Figure 8:
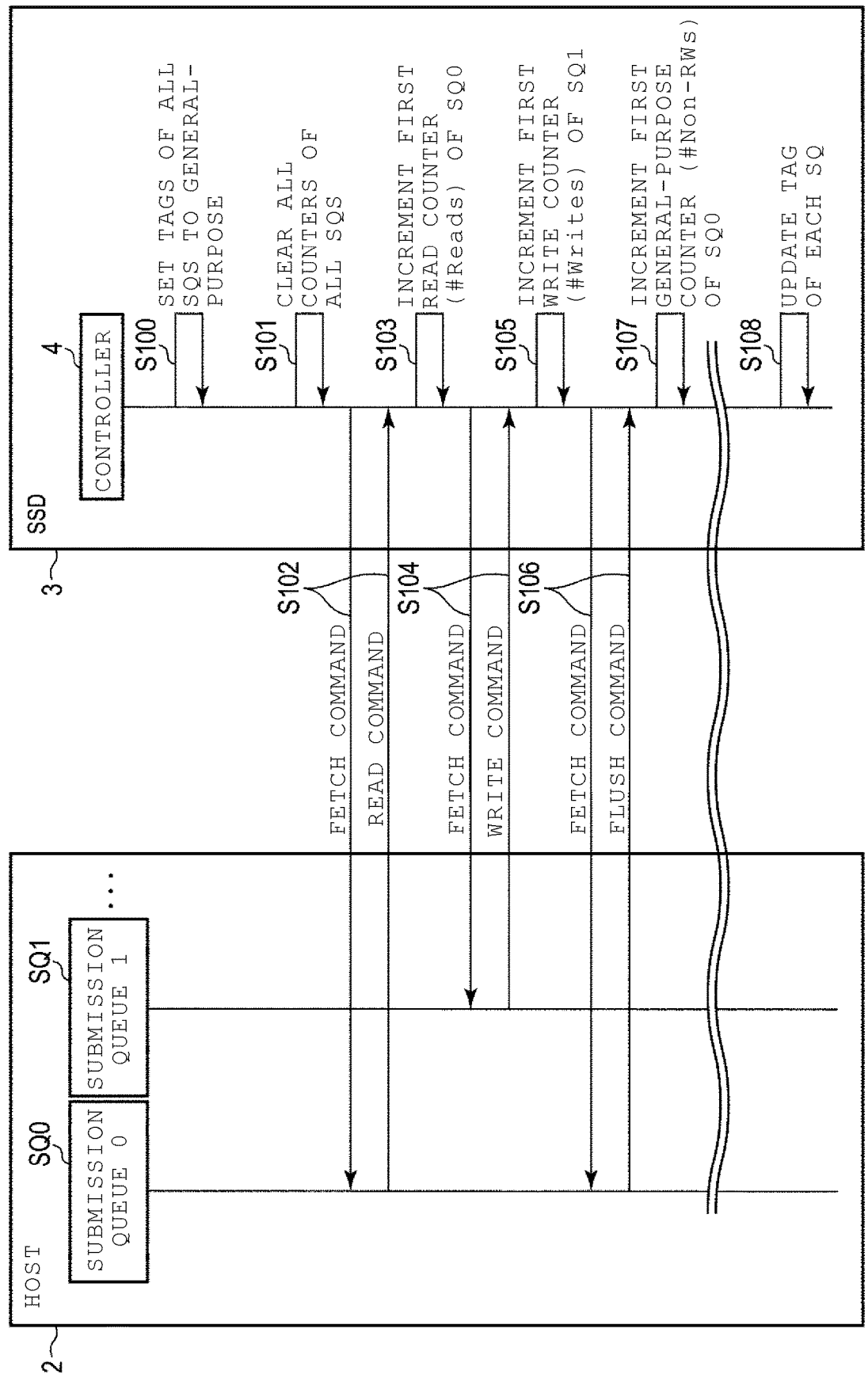
FIG. 8 is a sequence diagram illustrating an example of an operation of estimating uses of the submission queues that is executed in the memory system according to at least one embodiment.

FIG. 8 is a sequence diagram illustrating an example of the operation of estimating the use of the submission queue SQ that is executed by the controller 4 of the SSD 3. The operation includes an operation of controlling the counter corresponding to the submission queue SQ and an operation of correlating the submission queue SQ to a tag.

First, for example, in an initial state immediately after the plurality of submission queues SQ are created, the SQ determination unit 431 in the controller 4 executes initialization of setting the tags of all submission queues SQ to general-purpose (S100). That is, the SQ determination unit 431 creates (or updates) the SQ-tag table 422 such that the tags of all submission queues SQ are set to general-purpose. More specifically, the SQ determination unit 431 sets the tags to general-purpose in all entries in the SQ-tag table 422.

The SQ determination unit 431 clears all counters corresponding to each of all submission queues SQ (Step S101). That is, the SQ determination unit 431 updates the counter table 421 such that all counters corresponding to each of all submission queues SQ are set to an initial value (for example, 0).

FIG. 9 illustrates the counter table 421 updated by the operation of S101. In the counter table 421 illustrated in FIG. 9, all counters corresponding to each of all submission queues SQ are set to 0. Specifically, each of the first read counter #Reads, the first write counter #Writes, and the first general-purpose counter #Non-RWs corresponding to the submission queue SQ0 is set to 0. Each of the first read counter #Reads, the first write counter #Writes, and the first general-purpose counter #Non-RWs corresponding to the submission queue SQ1 is set to 0.

Next, the host I/F 41 selects the submission queue SQ0 as the submission queue SQ to be fetched, and the command fetch control unit 432 fetches a read command from the submission queue SQ0 (Step S102). The command fetch control unit 432 increments the first read counter #Reads corresponding to the submission queue SQ0 according to the fetched read command (Step S103).

FIG. 10 illustrates the counter table 421 updated by the operation of S103. In the counter table 421 illustrated in FIG. 10, the first read counter #Reads corresponding to the submission queue SQ0 is updated from 0 to 1 by being incremented based on the read command fetched from the submission queue SQ0.

Next, the host I/F 41 selects the submission queue SQ1 as the submission queue SQ to be fetched, and the command fetch control unit 432 fetches a write command from the submission queue SQ1 (Step S104). The command fetch control unit 432 increments the first write counter #Writes corresponding to the submission queue SQ1 according to the fetched write command (Step S105).

FIG. 11 illustrates the counter table 421 updated by the operation of S105. In the counter table 421 illustrated in FIG. 11, the first write counter #Writes corresponding to the submission queue SQ1 is updated from 0 to 1 by being incremented based on the write command fetched from the submission queue SQ1.

Next, the host I/F 41 selects the submission queue SQ0 as the submission queue SQ to be fetched, and the command fetch control unit 432 fetches a flush command from the submission queue SQ0 (Step S106). The command fetch control unit 432 increments the first general-purpose counter #Non-RWs corresponding to the submission queue SQ0 according to the fetched flush command (Step S107).

FIG. 12 illustrates the counter table 421 updated by the operation of S107. In the counter table 421 illustrated in FIG. 12, the first general-purpose counter #Non-RWs corresponding to the submission queue SQ0 is updated from 0 to 1 by being incremented based on the flush command fetched from the submission queue SQ0.

Likewise, an operation of fetching a command from each of the submission queues SQ and an operation of incrementing the counter corresponding to the fetched command are repeatedly executed. Here, the case where one command is fetched in a single command fetch process is described. However, two or more commands may be fetched in a single command fetch process. When two or more commands are fetched in a single command fetch process, the controller 4 increments the value of the counter by the same number as the number of fetched commands.

When the total number of commands fetched after clearing the counters in S101 reaches the first threshold or when the first time elapses after clearing the counters in S101, the SQ determination unit 431 updates the tag of each of the submission queues SQ0 and SQ1 using the counter table 421 (Step S108).

FIG. 13 illustrates an example of the counter table 421 when the total number of commands fetched after clearing the counters in S101 reaches the first threshold or when a given period of time elapses after clearing the counters in S101.

Specifically, the first read counter #Reads corresponding to the submission queue SQ0 is 100. The first write counter #Writes corresponding to the submission queue SQ0 is 5. The first general-purpose counter #Non-RWs corresponding to the submission queue SQ0 is 10.

The first read counter #Reads corresponding to the submission queue SQ1 is 5. The first write counter #Writes corresponding to the submission queue SQ1 is 100. The first general-purpose counter #Non-RWs corresponding to the submission queue SQ1 is 10.

In S108, the SQ determination unit 431 estimates the use of each of the plurality of submission queues SQ based on the types of one or more commands fetched from each of the plurality of submission queues SQ. For example, the SQ determination unit 431 estimates the use of the submission queue SQ0 based on the types of one or more commands fetched from the submission queue SQ0. The SQ determination unit 431 estimates the use of the submission queue SQ1 based on the types of one or more commands fetched from the submission queue SQ1.

Specifically, the SQ determination unit 431 specifies a counter having the maximum value among the three counters corresponding to one submission queue SQ, and executes, for each of the submission queues SQ, the operation of correlating a tag corresponding to the specified counter to the submission queue SQ. For example, when the value of the first read counter #Reads is the maximum among the first read counter #Reads, the first write counter #Writes, and the first general-purpose counter #Non-RWs corresponding to the submission queue SQ0, the SQ determination unit 431 correlates the tag representing for read to the submission queue SQ0. When the value of the first write counter #Writes is the maximum among the first read counter #Reads, the first write counter #Writes, and the first general-purpose counter #Non-RWs corresponding to the submission queue SQ0, the SQ determination unit 431 correlates the tag representing for write to the submission queue SQ0. When the value of the first general-purpose counter #Non-RWs is the maximum among the first read counter #Reads, the first write counter #Writes, and the first general-purpose counter #Non-RWs corresponding to the submission queue SQ0, the SQ determination unit 431 correlates the tag representing general-purpose to the submission queue SQ0. Likewise, the SQ determination unit 431 correlates each of the other submission queues SQ to the tag.

When a plurality of counters having the maximum value are present among the plurality of counters corresponding to the submission queue SQ0, the SQ determination unit 431 may correlate the tag representing general-purpose to the submission queue SQ0. When a difference between the maximum value and the second largest value of the counter is a threshold or more, the SQ determination unit 431 may correlate the tag to the submission queue SQ0.

The SQ determination unit 431 updates the SQ-tag table 422 based on the tag newly correlated to each of the plurality of submission queues SQ. Specifically, for example, the SQ determination unit 431 specifies an entry corresponding to the submission queue SQ0 in the SQ-tag table 422. The SQ determination unit 431 rewrites the tag set to the tag field of the specified entry with the tag newly correlated to the submission queue SQ0.

When the counter table 421 illustrated in FIG. 13 is used, the SQ determination unit 431 specifies the first read counter #Reads having the maximum value from the three counters corresponding to the submission queue SQ0. The SQ determination unit 431 correlates the tag representing for read that corresponds to the specified first read counter #Reads to the submission queue SQ0. The SQ determination unit 431 specifies the first write counter #Writes having the maximum value from the three counters corresponding to the submission queue SQ1. The SQ determination unit 431 correlates the tag representing for write that corresponds to the specified first write counter #Writes to the submission queue SQ1.

FIG. 14 illustrates the SQ-tag table 422 updated by the operation of S108. In the SQ-tag table 422 illustrated in FIG. 14, the tag correlated to the submission queue SQ0 is updated from general-purpose to for read. The tag correlated to the submission queue SQ1 is updated from general-purpose to for write.

Next, the SQ determination unit 431 returns to S101 and resets again all counters corresponding to each of all submission queues SQ. As a result, the operation of determining the use of the submission queue SQ is repeatedly executed. Accordingly, the controller 4 can dynamically update the tag correlated to the submission queue SQ according to the tendency of the type of the command fetched from the submission queue SQ.

Next, a fetch management and control process that is executed by the SSD 3 will be described with reference to FIGS. 15 and 16.

Figure 15:
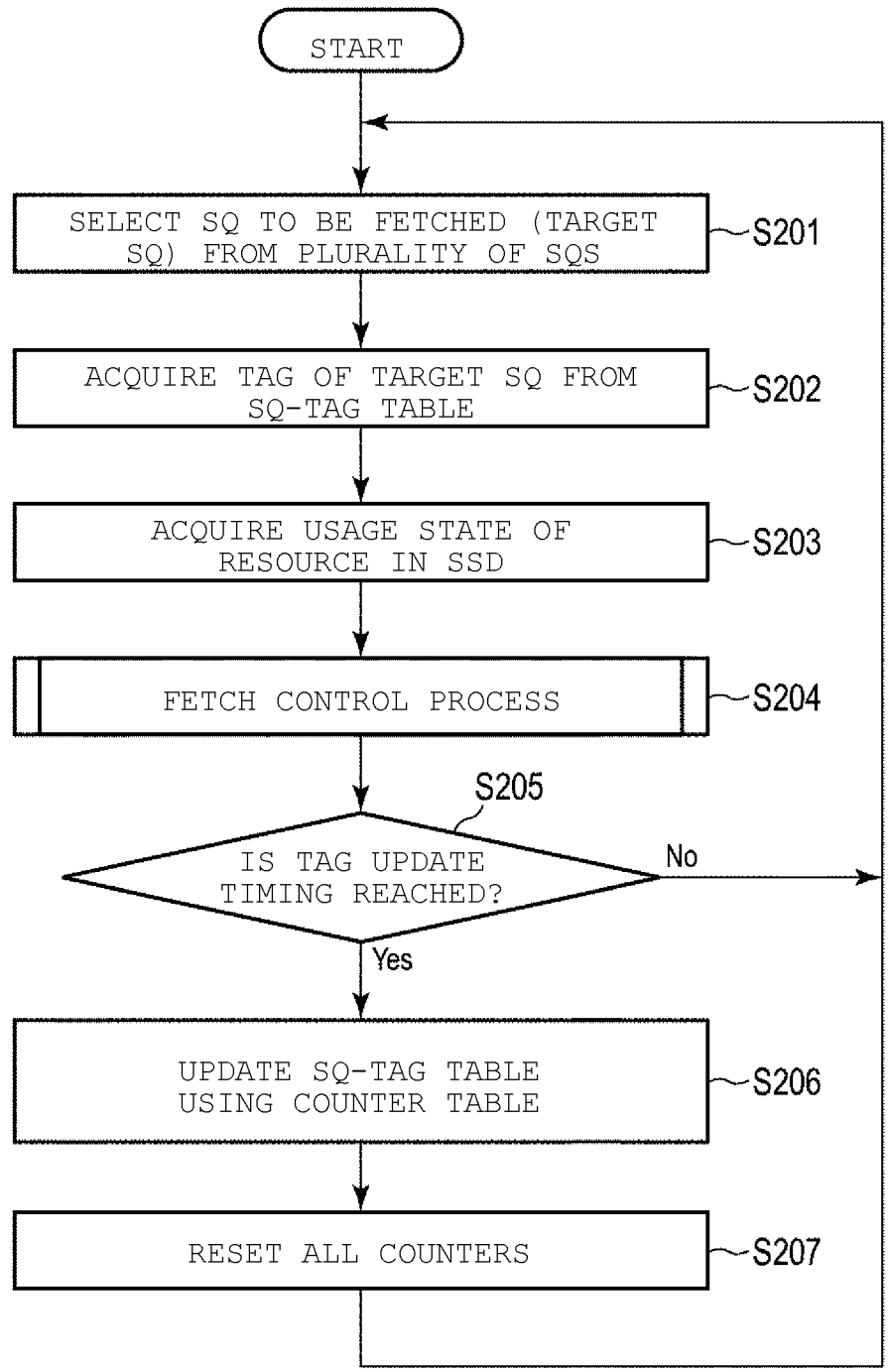
FIG. 15 is a flowchart illustrating a procedure of a fetch management and control process that is executed by the memory system according to at least one embodiment.

FIG. 15 is a flowchart illustrating an example of a procedure of the fetch management and control process that is executed in the SSD 3.

First, the controller 4 selects the submission queue SQ to be fetched (target submission queue SQ) from the plurality of submission queues SQ (Step S201). Specifically, the controller 4 selects the target submission queue SQ according to the specific arbitration mechanism (for example, the round robin).

The controller 4 acquires the tag correlated to the target submission queue SQ from the SQ-tag table 422 (Step S202). Specifically, the controller 4 specifies an entry corresponding to the target submission queue SQ in the SQ-tag table 422. Then, the controller 4 acquires a tag from the specified entry. The tag is, for example, information representing any one of for read, for write, and general-purpose.

The controller 4 acquires the usage state of the resource in the SSD 3 (Step S203). The usage state of the resource in the SSD 3 includes, for example, information regarding the available area of the read buffer 61, information regarding the available area of the write buffer 62, and information regarding power consumption of the SSD 3.

The controller 4 executes the fetch control process (Step S204). The fetch control process is a process of controlling the fetching of a command from the target submission queue SQ based on the tag acquired in S202 and the usage state of the resource acquired in S203. An example of a specific procedure of the fetch control process will be described below with reference to FIG. 16.

Next, the controller 4 determines whether a timing at which the tag of the submission queue SQ is updated is reached (Step S205). For example, when the total number of fetched commands reaches a threshold after resetting all counters corresponding to the plurality of submission queues SQ, the controller 4 determines that the timing at which the tag of the submission queue SQ is updated is reached. When a given period of time elapses after resetting all counters corresponding to the plurality of submission queues SQ, the controller 4 determines that the timing at which the tag of the submission queue SQ is updated is reached.

When the timing at which the tag of the submission queue SQ is updated is not reached (No in S205), the controller 4 returns to S201 and executes a process of selecting the next target submission queue SQ and controlling the fetching of a command.

When the timing at which the tag of the submission queue SQ is updated is reached (Yes in S205), the controller 4 updates the SQ-tag table 422 using the counter table 421 (Step S206). A method of updating the SQ-tag table 422 using the counter table 421 is as described above with reference to FIGS. 8 to 14. Then, the controller 4 resets all counters (Step S207). The value of each of the counters is set to, for example, 0. The controller 4 returns to S201 and executes a process of selecting the next target submission queue SQ and controlling the fetching of a command.

Figure 16:
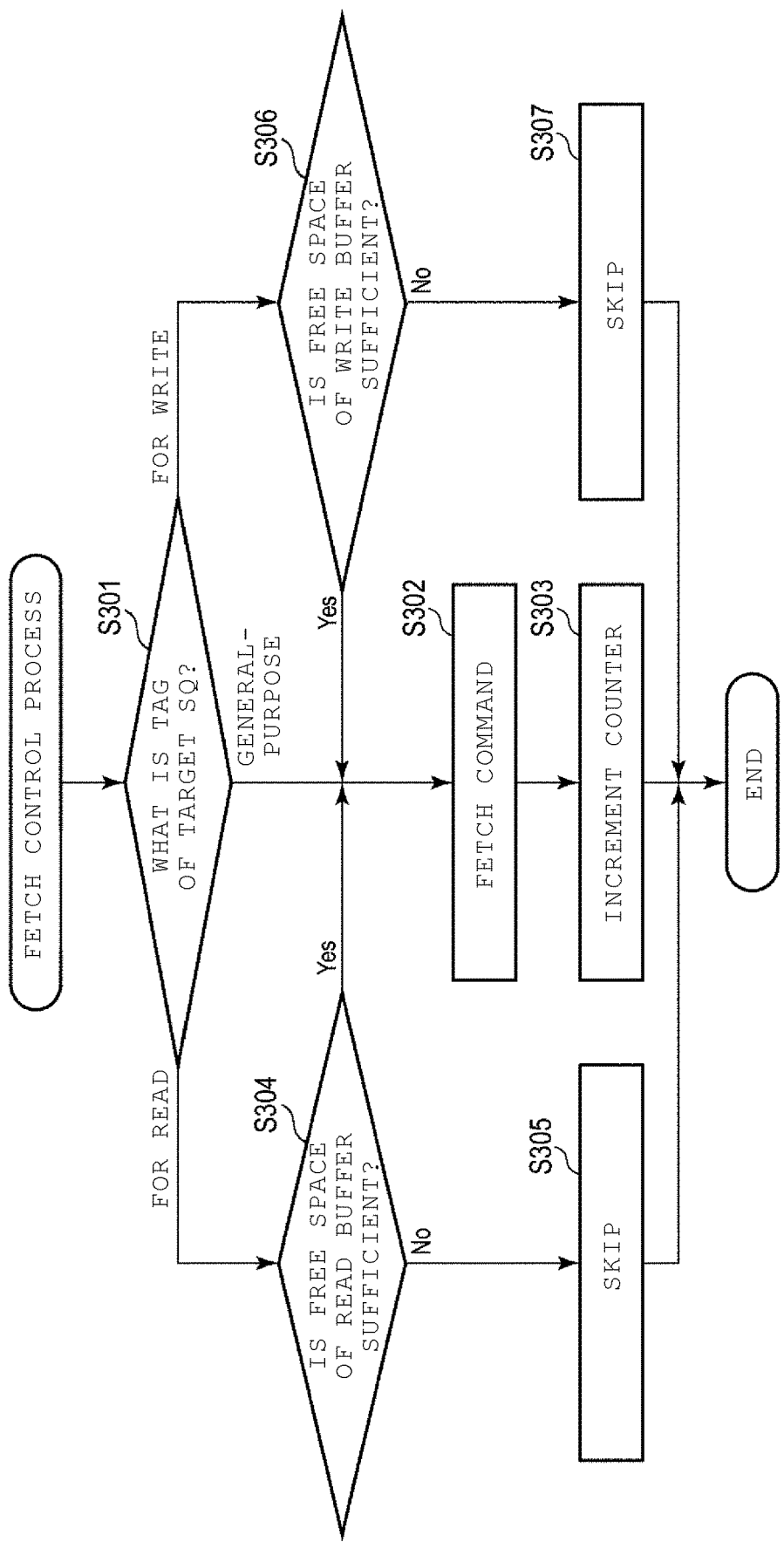
FIG. 16 is a flowchart illustrating a first example of the procedure of the fetch control process that is executed by the memory system according to at least one embodiment.

FIG. 16 is a flowchart illustrating a first example of the procedure of the fetch control process that is executed in the SSD 3. The fetch control process is a process of controlling the fetching of a command from the target submission queue SQ based on the tag correlated to the target submission queue SQ and the usage state of the resource in the SSD 3. The fetch control process corresponds to Step S204 of the fetch management and control process described above with reference to FIG. 15. Here, a case where an index regarding the available area of the read buffer 61 and an index regarding the available area of the write buffer 62 are used as the usage state of the resource in the SSD 3 is described as an example. As the plurality of counters corresponding to each of the submission queues SQ, three counters including the first read counter, the first write counter, and the first general-purpose counter are used.

First, the controller 4 branches the process based on the tag correlated to the target submission queue SQ (Step S301). The tag correlated to the target submission queue SQ is the tag acquired in S202 of the fetch management and control process described above with reference to FIG. 15.

When the tag correlated to the target submission queue SQ represents general-purpose (general-purpose in S301), the controller 4 fetches a command from the target submission queue SQ (Step S302). In the SSD 3, a process corresponding to the fetched command is executed. The controller 4 increments a counter corresponding to the type of the fetched command among the three counters corresponding to the target submission queue SQ (Step S303), and ends the fetch control process.

When the tag correlated to the target submission queue SQ represents for read (for read in S301), the controller 4 determines whether the available area of the read buffer 61 is sufficient based on the usage state of the resource in the SSD 3 (Step S304). Specifically, the controller 4 determines, for example, whether the size of the available area of the read buffer 61 is the second threshold or more.

When the available area of the read buffer 61 is sufficient (for example, when the size of the available area of the read buffer 61 is the second threshold or more) (Yes in S304), the controller 4 fetches a command from the target submission queue SQ (Step S302). The controller 4 increments a counter corresponding to the type of the fetched command among the three counters corresponding to the target submission queue SQ (Step S303), and ends the fetch control process.

When the available area of the read buffer 61 is insufficient (for example, when the size of the available area of the read buffer 61 is less than the second threshold) (No in S304), the controller 4 skips the fetching of a command from the target submission queue SQ (Step S305), and ends the fetch control process. That is, the controller 4 ends the fetch control process without fetching a command from the target submission queue SQ.

When the tag correlated to the target submission queue SQ represents for write (for write in S301), the controller 4 determines whether the available area of the write buffer 62 is sufficient based on the usage state of the resource in the SSD 3 (Step S306). Specifically, the controller 4 determines, for example, whether the size of the available area of the write buffer 62 is the third threshold or more.

When the available area of the write buffer 62 is sufficient (for example, when the size of the available area of the write buffer 62 is the third threshold or more) (Yes in S306), the controller 4 fetches a command from the target submission queue SQ (Step S307). The controller 4 increments a counter corresponding to the type of the fetched command among the three counters corresponding to the target submission queue SQ (Step S303), and ends the fetch control process.

When the available area of the write buffer 62 is insufficient (for example, when the size of the available area of the write buffer 62 is less than the third threshold) (No in S306), the controller 4 skips the fetching of a command from the target submission queue SQ (Step S307), and ends the fetch control process.

When the operation of S201 of FIG. 15 is executed again after ending the fetch control process, after the fetching of commands from all submission queues SQ is continuously skipped, the controller 4 may determine to fetch a command from the target submission queue SQ that is initially selected. Alternatively, here, the controller 4 may determine not to fetch a command from any submission queue SQ.

Through the above-described fetch management and control process, the controller 4 can control the fetching of a command from the target submission queue SQ based on the tag correlated to the target submission queue SQ and the usage state of the resource in the SSD 3. Specifically, when the tag of the target submission queue SQ represents for read, the controller 4 can control whether to execute or to skip the fetching of a command from the target submission queue SQ depending on whether the available area of the read buffer 61 is sufficient. When the tag of the target submission queue SQ represents for write, the controller 4 can control whether to execute or to skip the fetching of a command from the target submission queue SQ depending on whether the available area of the write buffer 62 is sufficient. When the tag of the target submission queue SQ represents general-purpose, the controller 4 can fetch a command from the target submission queue SQ. The controller 4 can increment the counter corresponding to the type of the fetched command.

As a result, a command is fetched from the submission queue SQ suitable for the usage state of the resource in the SSD 3. Therefore, the access performance from the host 2 to the SSD 3 can be improved.

Modification Example

The usage state of the resource in the SSD 3 is not limited to the indices regarding the available areas of the read buffer 61 and the write buffer 62, and may include information regarding various resources in the SSD 3. For example, the usage state of the resource in the SSD 3 may be an index regarding the power consumption of the SSD 3. Hereinafter, a modification example where the index regarding the power consumption of the SSD 3 is used as the usage state of the resource in the SSD 3 will be described.

In the SSD 3 according to the modification example, for example, any one tag among for read, for write, and general-purpose is correlated with each of the plurality of submission queues SQ.

The tag representing for read shows a tendency that the corresponding submission queue SQ is likely to store a command that causes the operation of reading user data from the NAND memory 5 (read operation). The command that causes the read operation is, for example, a read command or a copy command.

The tag representing for write shows a tendency that the corresponding submission queue SQ is likely to store a command that causes the operation of writing user data into the NAND memory 5 (write operation). The command that causes the write operation is, for example, a write command, a copy command, or a flush command.

The tag representing general-purpose shows a tendency that a command that does not cause any of the read operation and the write operation is likely to be stored. The command that does not cause any of the read operation and the write operation is, for example, a command for acquiring a log of the SSD 3. The command for acquiring a log of the SSD 3 is a command where power consumption is lower than that of the command that causes the read operation or the write operation.

When the plurality of tags that can be correlated to the submission queue SQ are the above-described three tags including for read, for write, and general-purpose, the counter table 421 includes three counters corresponding to the three tags for each of the submission queues SQ, respectively. The three counters include a second read counter #Reads, a second write counter #Writes, and a second general-purpose counter #Non-RWs.

As described above with reference to FIG. 7, when the command fetch control unit 432 is notified of the target submission queue SQ from the host I/F 41, the command fetch control unit 432 acquires the tag correlated to the target submission queue SQ from the SQ-tag table 422. The command fetch control unit 432 acquires the index regarding the power consumption of the SSD 3. The index regarding the power consumption of the SSD 3 may represent the current power consumption itself of the SSD 3 or may be a parameter based on the current power consumption of the SSD 3.

The command fetch control unit 432 determines whether to fetch a command from the target submission queue SQ based on the acquired tag and the index regarding the power consumption of the SSD 3.

Specifically, when the tag acquired from the target submission queue SQ represents for read or for write and the index regarding the power consumption of the SSD 3 is less than a fourth threshold, the command fetch control unit 432 fetches a command from the target submission queue SQ. When the tag acquired from the target submission queue SQ represents for read or for write and the index regarding the power consumption of the SSD 3 is the fourth threshold or more, the command fetch control unit 432 skips the fetching of a command from the target submission queue SQ.

When the tag acquired from the target submission queue SQ represents general-purpose, the command fetch control unit 432 fetches a command from the target submission queue SQ.

As a result, when the power consumption of the SSD 3 is the fourth threshold or more, the command fetch control unit 432 is controlled such that a command is not fetched from the submission queue SQ correlated to the tag representing any one of for read and for write. Accordingly, a command that is likely to cause the read operation and the write operation is not fetched. Therefore, when the power consumption of the SSD 3 is high, a further increase in power consumption can be avoided.

When a total number of commands fetched from the plurality of submission queues SQ reaches a first threshold after a specific timing or when a first time elapses from a specific timing, the SQ determination unit 431 estimates the use of each of the plurality of submission queues SQ based on the counter table 421.

Specifically, the SQ determination unit 431 specifies a counter having the maximum value among the three counters corresponding to one submission queue SQ, and executes, for each of the submission queues SQ, the operation of correlating a tag corresponding to the specified counter to the submission queue SQ. For example, when the value of the second read counter #Reads is the maximum among the second read counter #Reads, the second write counter #Writes, and the second general-purpose counter #Non-RWs corresponding to the submission queue SQ0, the SQ determination unit 431 correlates the tag representing for read to the submission queue SQ0. When the value of the second write counter #Writes is the maximum among the second read counter #Reads, the second write counter #Writes, and the second general-purpose counter #Non-RWs corresponding to the submission queue SQ0, the SQ determination unit 431 correlates the tag representing for write to the submission queue SQ0. When the value of the second general-purpose counter #Non-RWs is the maximum among the second read counter #Reads, the second write counter #Writes, and the second general-purpose counter #Non-RWs corresponding to the submission queue SQ0, the SQ determination unit 431 correlates the tag representing general-purpose to the submission queue SQ0.

When a plurality of counters having the maximum value are present among the plurality of counters corresponding to the submission queue SQ, the SQ determination unit 431 correlates the tag representing general-purpose to the submission queue SQ.

The SQ determination unit 431 can estimate the use of the submission queue SQ based on the types of one or more commands fetched from the submission queue SQ, and can correlate the tag representing the estimated use to the submission queue SQ.

FIG. 17 is a flowchart illustrating a second example of the procedure of the fetch control process that is executed in the SSD 3 according to the modification example. The fetch control process corresponds to Step S204 of the fetch management and control process described above with reference to FIG. 15.

First, the controller 4 branches the process based on the tag correlated to the target submission queue SQ (Step S401).

When the tag correlated to the target submission queue SQ represents general-purpose (general-purpose in S401), the controller 4 fetches a command from the target submission queue SQ (Step S402). The controller 4 increments a counter corresponding to the type of the fetched command among the three counters corresponding to the target submission queue SQ (Step S403), and ends the fetch control process.

When the tag correlated to the target submission queue SQ represents for read or for write (for read or for write in S401), the controller 4 determines whether the power consumption of the SSD 3 is less than the fourth threshold (Step S404).

When the power consumption of the SSD 3 is less than the fourth threshold (Yes in S404), the controller 4 fetches a command from the target submission queue SQ (Step S402). The controller 4 increments a counter corresponding to the type of the fetched command among the three counters corresponding to the target submission queue SQ (Step S403), and ends the fetch control process.

When the power consumption of the SSD 3 is the fourth threshold or more (No in S404), the controller 4 skips the fetching of a command from the target submission queue SQ (Step S405), and ends the fetch control process.

Through the above-described second example of the fetch control process, the controller 4 can control the fetching of a command from the target submission queue SQ based on the tag correlated to the target submission queue SQ and the usage state of the resource in the SSD 3. Specifically, when the tag of the target submission queue SQ represents for read or for write, the controller 4 can control whether to execute or to skip the fetching of a command from the target submission queue SQ depending on whether the power consumption of the SSD 3 is the fourth threshold or more. When the tag of the target submission queue SQ represents general-purpose, the controller 4 can fetch a command from the target submission queue SQ. Then, the controller 4 can increment the counter corresponding to the type of the fetched command.

As a result, a command suitable for the usage state of the resource in the SSD 3 is fetched from the submission queue SQ. Therefore, the access performance from the host 2 to the SSD 3 can be improved.

As described above, in the embodiment, when one submission queue SQ is selected as a target of command fetching, the controller 4 determines whether to fetch a command from the submission queue SQ based on the usage state of the resource in the SSD 3 and the use of the submission queue SQ. The controller 4 estimates the use of the submission queue SQ based on the command fetched from each of the submission queues SQ. The usage state of the resource in the SSD 3 is, for example, an index regarding the available area of the read buffer 61 or an index regarding the available area of the write buffer 62.

As a result, the controller 4 can fetch a command from the submission queue SQ from which a command of a type suitable for the usage state of the resource in the SSD 3 are likely to be fetched. Accordingly, the access performance to the SSD 3 can be improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, the memory system comprising:
a nonvolatile memory; and
a controller configured to:
control the nonvolatile memory,
fetch a command from a plurality of command queues each of which stores a command issued from the host to the memory system, and
execute a process corresponding to the fetched command, wherein
the controller is configured to:
estimate a use of each of the plurality of command queues at a first timing based on types of one or more commands fetched from each of the plurality of command queues, the use of each of the plurality of command queues including the use of storing read commands or the use of storing write commands,
determine a command queue from which a next command is to be fetched from the plurality of command queues based on the use of each of the plurality of command queues and a usage state of a resource in the memory system,
fetch a command from the determined command queue,
estimate a use of each of the plurality of command queues again at a second timing based on types of one or more commands fetched from each of the plurality of command queues, manage a read buffer that temporarily stores data read from the nonvolatile memory and to manage a write buffer that temporarily stores data to be written into the nonvolatile memory,
counters for each of the types of the commands include:
a first read counter configured to count commands that newly use the read buffer,
a first write counter configured to count commands that newly use the write buffer, and
a first general-purpose counter configured to count commands that do not newly use any of the read buffer and the write buffer, and wherein the controller is configured to estimate the use of each of the plurality of command queues using the first read counter, the first write counter, and the first general-purpose counter.

2. The memory system according to claim 1, wherein the second timing is a timing at which a total number of commands fetched from the plurality of command queues reaches a first threshold after the first timing.

3. The memory system according to claim 2, wherein the controller is configured to reset the first write counter, the first read counter, and the first general-purpose counter after the first timing, and
the controller is configured to estimate a use of each of the plurality of command queues again at the second timing.

4. The memory system according to claim 3, wherein the second timing is a timing at which a total number of commands fetched from the plurality of command queue reaches the first threshold again after the first read counter, the first write counter, and the first general-purpose counter are reset.

5. The memory system according to claim 3, wherein the second timing is a timing at which a first time elapses again after the first read counter, the first write counter, and the first general-purpose counter are reset.

6. The memory system according to claim 1, wherein the second timing is a timing at which a first time elapses from a first timing.

7. The memory system according to claim 1, wherein the controller is configured to estimate the use of each of the plurality of command queues at the first timing using the first read counter, the first write counter, and the first general-purpose counter.

8. The memory system according to claim 1, wherein the controller is configured to estimate a use of a first command queue among the plurality of command queues using the first read counter, the first write counter, and the first general-purpose counter corresponding to the first command queue, and
the controller is configured to:
  correlate first information representing a command that newly uses the read buffer to the first command queue when a value of the first read counter is the maximum among a value of the first read counter, a value of the first write counter, and a value of the first general-purpose counter,
  correlate second information representing a command that newly uses the write buffer to the first command queue when a value of the first write counter is the maximum among a value of the first read counter, a value of the first write counter, and a value of the first general-purpose counter, and
  correlate third information representing a command that does not newly use any of the read buffer and the write buffer to the first command queue when a value of the first general-purpose counter is the maximum among a value of the first read counter, a value of the first write counter, and a value of the first general-purpose counter.

9. The memory system according to claim 8, wherein the controller is configured to:
  determine whether to fetch a command from the first command queue based on a size of an available area in the read buffer when the command queue from which a next command is to be fetched is the first command queue, and the first information is correlated to the first command queue,
  determine whether to fetch a command from the first command queue based on a size of an available area in the write buffer when the command queue from which a next command is to be fetched is the first command queue, and the second information is correlated to the first command queue, and
  fetch a command from the first command queue when the command queue from which a next command is to be fetched is the first command queue and the third information is correlated to the first command queue.

10. The memory system according to claim 8, wherein the controller is configured to:
  increment the first read counter corresponding to the first command queue when a command that newly uses the read buffer is fetched from the first command queue,
  increment the first write counter corresponding to the first command queue when a command that newly uses the write buffer is fetched from the first command queue, and
  increment the first general-purpose counter corresponding to the first command queue when a command that does not newly use any of the read buffer or the write buffer is fetched from the first command queue.

11. The memory system according to claim 8, wherein the controller is configured to reset each of the first read counter, the first write counter, and the first general-purpose counter corresponding to each of the plurality of command queues to an initial value when any information among the first information, the second information, and the third information is correlated to each of the plurality of command queues.

12. The memory system according to claim 1, wherein the controller is configured to, when the command queue from which a next command is to be fetched is a first command queue among the plurality of command queues, determine whether to fetch a command from the first command queue based on a use of the first command queue and the usage state of the resource in the memory system.

13. The memory system according to claim 1, wherein the controller is configured to:
  manage counters for each of the types of the commands corresponding to each of the plurality of command queues,
  acquire the number of one or more commands per type fetched from each of the plurality of command queues using the counters for each of the types of the commands, and
  estimate a use of a corresponding command queue based on the acquired number of one or more commands per type.

14. The memory system according to claim 13, wherein the counters for each of the types of the commands include a second read counter configured to count commands that correspond to an operation of reading data from the nonvolatile memory, a second write counter configured to count commands that correspond to an operation of writing data into the nonvolatile memory, and a second general-purpose counter for counting commands that do not correspond to any of the operation of reading data from the nonvolatile memory or the operation of writing data into the nonvolatile memory, and the controller is configured to estimate the use of each of the plurality of command queues using the second read counter, the second write counter, and the second general-purpose counter.

15. The memory system according to claim 14, wherein the controller is configured to:
   refer to the second read counter, the second write counter, and the second general-purpose counter corresponding to a first command queue among the plurality of command queues at the first timing,
   correlate fourth information representing a command corresponding to the operation of reading data from the nonvolatile memory to the first command queue when a value of the second read counter is the maximum among a value of the second read counter, a value of the second write counter, and a value of the second general-purpose counter,
   correlate fifth information representing a command corresponding to the operation of writing data into the nonvolatile memory to the first command queue when a value of the second write counter is the maximum among a value of the second read counter, a value of the second write counter, and a value of the second general-purpose counter, and
   correlate sixth information representing a command that does not correspond to any of the operation of reading data from the nonvolatile memory and the operation of writing data into the nonvolatile memory to the first command queue when a value of the second general-purpose counter is the maximum among a value of the second read counter, a value of the second write counter, and a value of the second general-purpose counter.

16. The memory system according to claim 15, wherein the controller is configured to:
   determine whether to fetch a command from the first command queue based on power consumption of the memory system when the command queue from which a next command is to be fetched is the first command queue and the fourth information or the fifth information is correlated to the first command queue, and
   fetch a command from the first command queue when the command queue from which a next command is to be fetched is the first command queue and the sixth information is correlated to the first command queue.

17. The memory system according to claim 1, wherein the usage state of the resource includes a size of an available area of a read buffer that temporarily stores data read from the nonvolatile memory and a size of an available area of a write buffer that temporarily stores data to be written into the nonvolatile memory.

18. The memory system according to claim 1, wherein the usage state of the resource is power consumption of the memory system.

19. The memory system according to claim 1, wherein the plurality of command queues is provided in the host.

20. The memory system according to claim 19, wherein the controller is configured to:
control communication between the host and the memory system based on NVM express specification.

* * * * *